United States Patent [19]
Barton, III et al.

[11] Patent Number: 6,026,381
[45] Date of Patent: Feb. 15, 2000

[54] FINANCIAL MARKET CLASSIFICATION SYSTEM

[75] Inventors: Samuel G. Barton, III, Washington, D.C.; Madelyn E. Martin, Reston; Arthur T. Rodbell, Great Falls, both of Va.

[73] Assignee: ITX Corporation, McLean, Va.

[21] Appl. No.: 08/741,773

[22] Filed: Nov. 5, 1996

[51] Int. Cl.$^7$ .................................................. G06F 17/30
[52] U.S. Cl. .............................. 705/35; 705/36; 707/104
[58] Field of Search ................................ 705/35, 36, 37; 707/1, 2, 10, 3, 102, 104

[56] References Cited

U.S. PATENT DOCUMENTS

| | | | |
|---|---|---|---|
| 5,517,406 | 5/1996 | Harris et al. | 364/408 |
| 5,671,363 | 9/1997 | Cristofich et al. | 395/237 |
| 5,696,961 | 12/1997 | Briscoe et al. | 395/602 |
| 5,701,423 | 12/1997 | Crozier | 395/335 |
| 5,765,158 | 6/1998 | Burrows | 707/101 |
| 5,771,379 | 6/1998 | Gore, Jr. | 395/612 |
| 5,781,896 | 7/1998 | Dalal | 707/2 |
| 5,794,234 | 8/1998 | Church et al. | 707/4 |
| 5,809,483 | 9/1998 | Broka et al. | 705/37 |

*Primary Examiner*—Paul V. Kulik
*Attorney, Agent, or Firm*—Sterne, Kessler, Goldstein & Fox, P.L.L.C.

[57] ABSTRACT

A system for classifying investment products into a set of hierarchical buckets based on existing CUSIP numbers and other prospectus information is disclosed herein. A bucket is an investment product classification that uniquely and consistently identifies an investment product type. In the preferred embodiment, there are buckets to classify individual securities and mutual funds into product, asset and fund types. Each bucket is a unique combination of product, asset or fund codes. Unique combinations of the actual codes define a particular bucket. Thus, the present invention provides a standard classification system into which all investment products can be categorized and grouped. Three sets of hierarchical investment buckets are created to provide a standard set of both general and detailed investment buckets. Each set of buckets is directed to a specific classification purpose: a set of product buckets, a set of asset buckets, and a set of fund buckets. The present invention uses CUSIP numbers as the keys for aggregating securities into a standard set of product buckets, asset buckets and fund buckets. The present invention uses the standard product buckets, asset buckets and fund buckets to classify investment positions.

9 Claims, 18 Drawing Sheets

FIG. 20

| ZIP Codes | Assets in ZIP | | | ZIP % OF TOTAL | | |
|---|---|---|---|---|---|---|
| | All Firms ($Mil.) | Comp. ($Mil.) | Comp. % Shr. | For All Firms | For Comp. | Comp. Index |
| 77024 Houston, TX | 2,708.1 | 166.3 | 6.14 | 7.82 | 8.31 | 106 |
| 77002 Houston, TX | 1,281.8 | 81.1 | 6.33 | 3.70 | 4.05 | 109 |
| 77056 Houston, TX | 1,223.9 | 88.1 | 7.20 | 3.54 | 4.40 | 125 |
| 77079 Houston, TX | 1,120.0 | 61.5 | 5.49 | 3.24 | 3.08 | 95 |
| 77057 Houston, TX | 1,037.2 | 87.7 | 8.46 | 3.00 | 4.39 | 146 |
| 77005 Houston, TX | 965.7 | 54.3 | 5.63 | 2.79 | 2.72 | 97 |
| 77027 Houston, TX | 895.9 | 66.0 | 7.36 | 2.59 | 3.30 | 127 |
| 77019 Houston, TX | 879.7 | 71.2 | 8.09 | 2.54 | 3.56 | 140 |
| 77096 Houston, TX | 824.6 | 55.8 | 6.77 | 2.38 | 2.79 | 117 |
| 77478 Sugar Land, TX | 626.1 | 33.6 | 5.37 | 1.81 | 1.68 | 93 |
| 77025 Houston, TX | 597.1 | 63.2 | 10.58 | 1.72 | 3.16 | 183 |
| 77379 Spring, TX | 549.1 | 28.4 | 5.17 | 1.59 | 1.42 | 89 |
| 77479 Sugar Land, TX | 540.6 | 23.7 | 4.38 | 1.56 | 1.18 | 76 |
| 77077 Houston, TX | 537.6 | 25.0 | 4.66 | 1.55 | 1.25 | 81 |
| 77381 Spring, TX | 530.5 | 26.5 | 5.00 | 1.53 | 1.33 | 87 |
| 77042 Houston, TX | 521.4 | 31.9 | 6.12 | 1.51 | 1.60 | 106 |
| 77339 Humble, TX | 502.9 | 29.8 | 5.93 | 1.45 | 1.49 | 103 |
| 77063 Houston, TX | 482.9 | 24.6 | 5.10 | 1.40 | 1.23 | 88 |
| 77069 Houston, TX | 462.4 | 28.8 | 6.23 | 1.34 | 1.44 | 108 |
| 77401 Bellaire, TX | 431.3 | 25.8 | 5.97 | 1.25 | 1.29 | 103 |
| 77345 Humble, TX | 415.2 | 20.0 | 4.81 | 1.20 | 1.00 | 83 |
| 77450 Katy, TX | 410.7 | 18.9 | 4.61 | 1.19 | 0.95 | 80 |
| 77036 Houston, TX | 370.9 | 23.8 | 6.42 | 1.07 | 1.19 | 111 |
| 77062 Houston, TX | 365.5 | 12.6 | 3.44 | 1.06 | 0.63 | 59 |
| 77459 Missouri City, TX | 333.8 | 19.9 | 5.97 | 0.96 | 1.00 | 103 |
| 77098 Houston, TX | 325.2 | 21.0 | 6.47 | 0.94 | 1.05 | 112 |
| 77070 Houston, TX | 322.4 | 21.0 | 6.51 | 0.93 | 1.05 | 113 |
| 77030 Houston, TX | 317.3 | 19.9 | 6.28 | 0.92 | 1.00 | 109 |
| 77380 Spring, TX | 311.5 | 14.3 | 4.59 | 0.90 | 0.71 | 79 |
| 77040 Houston, TX | 304.9 | 10.5 | 3.44 | 0.88 | 0.52 | 60 |
| 77356 Montgomery, TX | 301.3 | 17.7 | 5.86 | 0.87 | 0.88 | 101 |
| 77055 Houston, TX | 296.3 | 19.9 | 6.71 | 0.86 | 0.99 | 116 |
| 77586 Seabrook, TX | 275.3 | 12.7 | 4.63 | 0.80 | 0.64 | 80 |
| 77566 Lake Jackson, TX | 274.3 | 7.3 | 2.65 | 0.79 | 0.36 | 46 |
| 77469 Richmond, TX | 274.2 | 13.0 | 4.72 | 0.79 | 0.65 | 82 |
| 77546 Friendswood, TX | 273.5 | 11.4 | 4.18 | 0.79 | 0.57 | 72 |
| 77074 Houston, TX | 263.4 | 20.0 | 7.60 | 0.76 | 1.00 | 132 |
| 77006 Houston, TX | 257.2 | 14.9 | 5.78 | 0.74 | 0.74 | 100 |
| 77090 Houston, TX | 251.6 | 19.0 | 7.56 | 0.73 | 0.95 | 131 |
| 77573 League City, TX | 243.5 | 10.1 | 4.15 | 0.70 | 0.50 | 72 |
| 77520 Baytown, TX | 240.3 | 17.0 | 7.09 | 0.69 | 0.85 | 123 |
| 77084 Houston, TX | 228.8 | 13.1 | 5.74 | 0.66 | 0.66 | 99 |
| 77059 Houston, TX | 228.5 | 7.3 | 3.21 | 0.66 | 0.37 | 55 |
| 77018 Houston, TX | 219.0 | 14.3 | 6.52 | 0.63 | 0.71 | 113 |
| 77043 Houston, TX | 211.0 | 10.5 | 4.99 | 0.61 | 0.53 | 86 |
| 77080 Houston, TX | 208.8 | 10.5 | 5.04 | 0.60 | 0.53 | 87 |
| 77095 Houston, TX | 208.6 | 9.2 | 4.43 | 0.60 | 0.46 | 77 |
| 77058 Houston, TX | 208.0 | 8.3 | 3.97 | 0.60 | 0.41 | 69 |
| 77521 Baytown, TX | 207.4 | 13.7 | 6.59 | 0.60 | 0.68 | 114 |
| 77429 Cypress, TX | 203.8 | 12.1 | 5.93 | 0.59 | 0.60 | 103 |
| 77035 Houston, TX | 203.2 | 11.6 | 5.69 | 0.59 | 0.58 | 98 |
| 77071 Houston, TX | 200.7 | 11.2 | 5.56 | 0.58 | 0.56 | 96 |

FIG. 21

| ZIP Codes | Assets in ZIP | | | ZIP % OF TOTAL | | |
|---|---|---|---|---|---|---|
| | All Firms ($Mil.) | Comp. ($Mil.) | Comp. % Shr. | For All Firms | For Comp. | Comp. Index |
| 77008 Houston, TX | 197.9 | 11.3 | 5.71 | 0.57 | 0.56 | 99 |
| 77066 Houston, TX | 195.1 | 11.5 | 5.91 | 0.56 | 0.58 | 102 |
| 77340 Huntsville, TX | 194.6 | 8.5 | 4.36 | 0.56 | 0.42 | 75 |
| 77010 Houston, TX | 193.6 | 20.6 | 10.65 | 0.56 | 1.03 | 184 |
| 77550 Galveston, TX | 179.6 | 6.6 | 3.68 | 0.52 | 0.33 | 64 |
| 77304 Conroe, TX | 174.5 | 8.1 | 4.64 | 0.50 | 0.40 | 80 |
| 77068 Houston, TX | 173.7 | 7.6 | 4.36 | 0.50 | 0.38 | 75 |
| 77388 Spring, TX | 164.2 | 8.9 | 5.42 | 0.47 | 0.45 | 94 |
| 77551 Galveston, TX | 158.1 | 3.0 | 1.93 | 0.46 | 0.15 | 33 |
| 77581 Pearland, TX | 156.0 | 7.7 | 4.94 | 0.45 | 0.38 | 85 |
| 77375 Tomball, TX | 148.6 | 8.0 | 5.39 | 0.43 | 0.40 | 93 |
| 77346 Humble, TX | 148.0 | 9.2 | 6.21 | 0.43 | 0.46 | 107 |
| 77502 Pasedena, TX | 146.9 | 8.0 | 5.47 | 0.42 | 0.40 | 95 |
| 77590 Texas City, TX | 146.1 | 4.2 | 2.89 | 0.42 | 0.21 | 50 |
| 77511 Alvin, TX | 145.6 | 5.7 | 3.90 | 0.42 | 0.28 | 67 |
| 77007 Houston, TX | 140.9 | 10.3 | 7.32 | 0.41 | 0.52 | 127 |
| 77301 Conroe, TX | 121.9 | 4.1 | 3.33 | 0.35 | 0.20 | 58 |
| 77083 Houston, TX | 116.1 | 4.1 | 3.49 | 0.34 | 0.20 | 60 |
| 77414 Bay City, TX | 114.6 | 3.4 | 2.99 | 0.33 | 0.17 | 52 |
| 77088 Houston, TX | 113.3 | 7.2 | 6.39 | 0.33 | 0.36 | 111 |
| 77046 Houston, TX | 112.4 | 6.5 | 5.82 | 0.32 | 0.33 | 101 |
| 77539 Dickinson, TX | 111.4 | 4.0 | 3.60 | 0.32 | 0.20 | 62 |
| 77092 Houston, TX | 106.5 | 5.0 | 4.68 | 0.31 | 0.25 | 81 |
| 77089 Houston, TX | 105.4 | 4.1 | 3.91 | 0.30 | 0.21 | 68 |
| 77536 Deer Park, TX | 104.2 | 4.3 | 4.09 | 0.30 | 0.21 | 71 |
| 77004 Houston, TX | 102.7 | 6.4 | 6.24 | 0.30 | 0.32 | 108 |
| 77094 Houston, TX | 97.5 | 3.0 | 3.12 | 0.28 | 0.15 | 54 |
| 77571 La Porte, TX | 95.2 | 6.4 | 6.74 | 0.28 | 0.32 | 117 |
| 77072 Houston, TX | 94.1 | 4.5 | 4.73 | 0.27 | 0.22 | 82 |
| 77099 Houston, TX | 93.4 | 4.7 | 5.05 | 0.27 | 0.24 | 87 |
| 77437 El Campo, TX | 93.4 | 2.3 | 2.42 | 0.27 | 0.11 | 42 |
| 77554 Galveston, TX | 93.4 | 3.4 | 3.69 | 0.27 | 0.17 | 64 |
| 77302 Conroe, TX | 92.6 | 6.2 | 6.66 | 0.27 | 0.31 | 115 |
| 77477 Stafford, TX | 90.5 | 4.6 | 5.03 | 0.26 | 0.23 | 87 |
| 77054 Houston, TX | 90.1 | 4.9 | 5.44 | 0.26 | 0.25 | 94 |
| 77584 Pearland, TX | 88.8 | 6.5 | 7.34 | 0.26 | 0.33 | 127 |
| 77081 Houston, TX | 85.8 | 3.6 | 4.23 | 0.25 | 0.18 | 73 |
| 77389 Spring, TX | 84.4 | 5.7 | 6.77 | 0.24 | 0.29 | 117 |
| 77378 Willis, TX | 83.9 | 5.3 | 6.36 | 0.24 | 0.27 | 110 |
| 77065 Houston, TX | 81.9 | 4.1 | 4.97 | 0.24 | 0.20 | 86 |
| 77493 Katy, TX | 81.7 | 2.9 | 3.60 | 0.24 | 0.15 | 62 |
| 77041 Houston, TX | 79.9 | 3.7 | 4.64 | 0.23 | 0.19 | 80 |
| 77355 Magnolia, TX | 79.3 | 4.5 | 5.71 | 0.23 | 0.23 | 99 |
| 77082 Houston, TX | 78.7 | 3.2 | 4.07 | 0.23 | 0.16 | 70 |
| 77064 Houston, TX | 78.6 | 6.5 | 8.26 | 0.23 | 0.32 | 143 |
| 77373 Spring, TX | 78.4 | 4.2 | 5.35 | 0.23 | 0.21 | 93 |
| 77015 Houston, TX | 77.2 | 4.2 | 5.45 | 0.22 | 0.21 | 94 |
| 77031 Houston, TX | 76.8 | 4.7 | 6.09 | 0.22 | 0.23 | 105 |
| 77515 Angleton, TX | 74.8 | 2.8 | 3.73 | 0.22 | 0.14 | 65 |
| 77575 Liberty, TX | 74.1 | 2.3 | 3.11 | 0.21 | 0.12 | 54 |

FIG. 22

|  | Assets in ZIP | | | ZIP % OF TOTAL | | |
|---|---|---|---|---|---|---|
| ZIP Codes | All Firms ($Mil.) | Comp. ($Mil.) | Comp. % Shr. | For All Firms | For Comp. | Comp. Index |
| 77061 Houston ,TX | 73.8 | 3.7 | 5.04 | 0.21 | 0.19 | 87 |
| 77504 Pasedena, TX | 71.3 | 3.1 | 4.28 | 0.21 | 0.15 | 74 |
| 77488 Wharton, TX | 71.3 | 3.8 | 5.37 | 0.21 | 0.19 | 93 |
| 77441 Fulshear ,TX | 71.2 | 3.0 | 4.18 | 0.21 | 0.15 | 72 |
| 77017 Houston, TX | 70.2 | 4.2 | 6.05 | 0.20 | 0.21 | 105 |
| 77471 Rosenberg ,TX | 70.1 | 3.6 | 5.10 | 0.20 | 0.18 | 88 |
| 77009 Houston, TX | 69.8 | 5.4 | 7.73 | 0.20 | 0.27 | 134 |
| 77532 Crosby, TX | 67.9 | 4.2 | 6.25 | 0.20 | 0.21 | 108 |
| 77338 Humble, TX | 67.0 | 3.0 | 4.47 | 0.19 | 0.15 | 77 |
| 77494 Katy, TX | 66.1 | 3.4 | 5.08 | 0.19 | 0.17 | 88 |
| 77598 Webster, TX | 61.5 | 1.9 | 3.05 | 0.18 | 0.09 | 53 |
| 77386 Spring, TX | 61.1 | 3.2 | 5.26 | 0.18 | 0.16 | 91 |
| 77449 Katy, TX | 61.1 | 3.1 | 5.02 | 0.18 | 0.15 | 87 |
| 77023 Houston, TX | 60.9 | 3.6 | 5.96 | 0.18 | 0.18 | 103 |
| 77034 Houston, TX | 60.0 | 1.8 | 2.97 | 0.17 | 0.09 | 51 |
| 77505 Pasedena, TX | 58.5 | 2.4 | 4.10 | 0.17 | 0.12 | 71 |
| 77327 Cleveland, TX | 57.9 | 2.4 | 4.15 | 0.17 | 0.12 | 72 |
| 78934 Columbus, TX | 57.0 | 0.3 | 0.45 | 0.16 | 0.01 | 8 |
| 77568 La Marque, TX | 52.2 | 2.5 | 4.85 | 0.15 | 0.13 | 84 |
| 77087 Houston, TX | 51.3 | 4.1 | 7.91 | 0.15 | 0.20 | 137 |
| 77073 Houston, TX | 51.2 | 2.3 | 4.41 | 0.15 | 0.11 | 76 |
| 77418 Bellville, TX | 50.2 | 4.0 | 7.91 | 0.14 | 0.20 | 137 |
| 77541 Freeport, TX | 49.3 | 0.9 | 1.80 | 0.14 | 0.04 | 31 |
| 77506 Pasedena, TX | 48.8 | 1.8 | 3.63 | 0.14 | 0.09 | 63 |
| 77486 West Columbia, TX | 46.6 | 2.6 | 5.54 | 0.13 | 0.13 | 96 |
| 77535 Dayton, TX | 45.7 | 2.8 | 6.04 | 0.13 | 0.14 | 104 |
| 77565 Kehman, TX | 45.2 | 1.8 | 4.08 | 0.13 | 0.09 | 71 |
| 77060 Houston, TX | 42.3 | 3.3 | 7.80 | 0.12 | 0.16 | 135 |
| 77979 Port Lavaca ,TX | 41.5 | 1.0 | 2.38 | 0.12 | 0.05 | 41 |
| 77868 Navasota, TX | 37.4 | 1.9 | 4.99 | 0.11 | 0.09 | 86 |
| 77957 Edna, TX | 37.2 | 1.4 | 3.65 | 0.11 | 0.07 | 63 |
| 77331 Coldspring, TX | 36.9 | 1.9 | 5.19 | 0.11 | 0.10 | 90 |
| 77591 Texas City, TX | 35.6 | 1.5 | 4.12 | 0.10 | 0.07 | 71 |
| 77510 Santa Fe, TX | 35.4 | 1.6 | 4.47 | 0.10 | 0.08 | 77 |
| 77474 Sealy, TX | 35.3 | 2.3 | 6.44 | 0.10 | 0.11 | 111 |
| 77503 Pasadena, TX | 32.4 | 1.4 | 4.26 | 0.09 | 0.07 | 74 |
| 77489 Missouri City, TX | 31.4 | 2.0 | 6.42 | 0.09 | 0.10 | 111 |
| 77480 Sweeny, TX | 31.2 | 0.6 | 1.84 | 0.09 | 0.03 | 32 |
| 77530 Channelview,TX | 29.0 | 1.6 | 5.64 | 0.08 | 0.08 | 98 |
| 77385 Conroe, TX | 28.9 | 1.1 | 3.82 | 0.08 | 0.06 | 66 |
| 78962 Weimar, TX | 28.7 | 0.6 | 2.00 | 0.08 | 0.03 | 35 |
| 77076 Houston, TX | 28.6 | 1.1 | 3.96 | 0.08 | 0.06 | 69 |
| 77422 Brazoria, TX | 28.6 | 1.1 | 3.69 | 0.08 | 0.05 | 64 |
| 77665 Winnie, TX | 27.4 | 1.2 | 4.42 | 0.08 | 0.06 | 76 |
| 77014 Houston, TX | 26.4 | 1.4 | 5.33 | 0.08 | 0.07 | 92 |
| 77012 Houston, TX | 26.3 | 0.6 | 2.31 | 0.08 | 0.03 | 40 |
| 77423 Brookshire ,TX | 26.2 | 1.9 | 7.11 | 0.08 | 0.09 | 123 |
| 77650 Port Bolivar, TX | 25.6 | 1.1 | 4.32 | 0.07 | 0.06 | 75 |
| 77563 Hitchcock, TX | 25.4 | 0.9 | 3.58 | 0.07 | 0.05 | 62 |
| 77091 Houston, TX | 24.3 | 1.2 | 5.13 | 0.07 | 0.06 | 89 |

FIG. 23

| ZIP Codes | Assets in ZIP | | | ZIP % OF TOTAL | | |
|---|---|---|---|---|---|---|
| | All Firms ($Mil.) | Comp. ($Mil.) | Comp. % Shr. | For All Firms | For Comp. | Comp. Index |
| 77021 Houston, TX | 24.1 | 1.5 | 6.31 | 0.07 | 0.08 | 109 |
| 77303 Conroe, TX | 24.1 | 0.7 | 2.95 | 0.07 | 0.04 | 51 |
| 77531 Clute, TX | 23.7 | 0.3 | 1.20 | 0.07 | 0.01 | 21 |
| 77964 Hallettsville, TX | 23.3 | 1.3 | 5.65 | 0.07 | 0.07 | 98 |
| 77465 Palacios, TX | 22.7 | 1.9 | 8.54 | 0.07 | 0.10 | 148 |
| 77864 Madisonville, TX | 22.5 | 0.7 | 3.05 | 0.06 | 0.03 | 53 |
| 77032 Houston, TX | 22.1 | 0.4 | 1.62 | 0.06 | 0.02 | 28 |
| 77396 Humble, TX | 22.0 | 0.9 | 4.01 | 0.06 | 0.04 | 69 |
| 77028 Houston, TX | 20.8 | 3.8 | 18.20 | 0.06 | 0.19 | 315 |
| 77075 Houston, TX | 19.6 | 1.0 | 4.92 | 0.06 | 0.05 | 85 |
| 77067 Houston, TX | 19.6 | 1.4 | 7.29 | 0.06 | 0.07 | 126 |
| 78358 Fulton, TX | 19.5 | 0.9 | 4.71 | 0.06 | 0.05 | 81 |
| 77587 South Houston, TX | 18.1 | 1.3 | 7.21 | 0.05 | 0.07 | 125 |
| 77562 Highlands, TX | 17.9 | 0.7 | 3.90 | 0.05 | 0.03 | 67 |
| 77022 Houston, TX | 17.7 | 1.3 | 7.28 | 0.05 | 0.06 | 126 |
| 77357 New Caney, TX | 17.7 | 1.4 | 7.92 | 0.05 | 0.07 | 137 |
| 77093 Houston, TX | 17.5 | 1.0 | 5.59 | 0.05 | 0.05 | 97 |
| 77029 Houston, TX | 17.5 | 1.0 | 5.46 | 0.05 | 0.05 | 94 |
| 77382 Spring, TX | 17.3 | 0.4 | 2.30 | 0.05 | 0.02 | 40 |
| 77445 Hempstead, TX | 17.1 | 1.4 | 8.37 | 0.05 | 0.07 | 145 |
| 77013 Houston, TX | 17.1 | 1.6 | 9.12 | 0.05 | 0.08 | 158 |
| 77435 East Bernard, TX | 16.5 | 0.4 | 2.48 | 0.05 | 0.02 | 43 |
| 77447 Hockley, TX | 16.3 | 0.8 | 4.92 | 0.05 | 0.04 | 85 |
| 77434 Eagle Lake, TX | 16.1 | 0.5 | 2.90 | 0.05 | 0.02 | 50 |
| 77086 Houston, TX | 15.6 | 0.8 | 5.36 | 0.04 | 0.04 | 93 |
| 77045 Houston, TX | 15.4 | 1.1 | 7.30 | 0.04 | 0.06 | 126 |
| 77365 Porter, TX | 15.3 | 0.9 | 6.19 | 0.04 | 0.05 | 107 |
| 77336 Huffman, TX | 14.7 | 0.9 | 6.17 | 0.04 | 0.05 | 107 |
| 77484 Waller, TX | 14.7 | 1.2 | 7.87 | 0.04 | 0.06 | 136 |
| 77547 Galena Park, TX | 14.1 | 1.4 | 9.87 | 0.04 | 0.07 | 171 |
| 77442 Garwood, TX | 13.5 | 0.0 | 0.13 | 0.04 | 0.00 | 2 |
| 77037 Houston, TX | 13.4 | 0.8 | 5.74 | 0.04 | 0.04 | 99 |
| 77984 Shiner, TX | 12.8 | 0.3 | 2.59 | 0.04 | 0.02 | 45 |
| 77039 Houston, TX | 12.2 | 0.7 | 5.66 | 0.04 | 0.03 | 98 |
| 77578 Manvel, TX | 12.1 | 0.8 | 6.95 | 0.03 | 0.04 | 120 |
| 77461 Needville, TX | 12.0 | 0.4 | 3.45 | 0.03 | 0.02 | 60 |
| 77514 Anahuac, TX | 11.7 | 1.1 | 9.44 | 0.03 | 0.06 | 163 |
| 77518 Bacliff, TX | 11.5 | 0.9 | 7.97 | 0.03 | 0.05 | 138 |
| 77044 Houston, TX | 11.3 | 0.6 | 5.24 | 0.03 | 0.03 | 91 |
| 77583 Rosharon, TX | 11.2 | 0.8 | 7.34 | 0.03 | 0.04 | 127 |
| 77047 Houston, TX | 11.1 | 1.4 | 12.16 | 0.03 | 0.07 | 210 |
| 77033 Houston, TX | 10.4 | 0.5 | 4.67 | 0.03 | 0.02 | 81 |
| 77364 Pointblank, TX | 9.6 | 0.7 | 7.56 | 0.03 | 0.04 | 131 |
| 77020 Houston, TX | 9.5 | 0.3 | 3.21 | 0.03 | 0.02 | 56 |
| 77371 Shepherd, TX | 9.4 | 0.9 | 9.25 | 0.03 | 0.04 | 160 |
| 77038 Houston, TX | 9.3 | 0.5 | 5.40 | 0.03 | 0.03 | 94 |
| 77517 Santa Fe, TX | 9.3 | 0.2 | 2.12 | 0.03 | 0.01 | 37 |
| 77830 Anderson, TX | 9.2 | 0.7 | 7.35 | 0.03 | 0.03 | 127 |
| 77831 Bedias, TX | 9.2 | 1.1 | 11.86 | 0.03 | 0.05 | 205 |

FIG. 24

| ZIP | City | Col3 | Col4 | Col5 | Col6 | Col7 | Col8 |
|---|---|---|---|---|---|---|---|
| 77053 | Houston, TX | 9.0 | 0.9 | 9.50 | 0.03 | 0.04 | 164 |
| 77362 | Pinehurst, TX | 9.0 | 0.6 | 6.10 | 0.03 | 0.03 | 106 |
| 77049 | Houston, TX | 8.7 | 0.3 | 3.99 | 0.03 | 0.02 | 69 |
| 78950 | New Ulm, TX | 8.6 | 0.3 | 3.29 | 0.02 | 0.01 | 57 |
| 77430 | Damon, TX | 8.5 | 0.7 | 8.13 | 0.02 | 0.03 | 141 |
| 77384 | Conroe, TX | 7.9 | 0.5 | 6.25 | 0.02 | 0.02 | 108 |
| 77011 | Houston, TX | 7.7 | 0.3 | 3.36 | 0.02 | 0.01 | 58 |
| 77003 | Houston, TX | 7.3 | 0.3 | 4.80 | 0.02 | 0.02 | 83 |
| 77564 | Hull, TX | 7.0 | 0.2 | 2.84 | 0.02 | 0.01 | 49 |
| 77016 | Houston, TX | 6.9 | 0.4 | 5.18 | 0.02 | 0.02 | 90 |
| 78933 | Cat Spring, TX | 6.7 | 0.1 | 2.01 | 0.02 | 0.01 | 35 |
| 77962 | Ganado, TX | 6.6 | 0.6 | 8.79 | 0.02 | 0.03 | 152 |
| 77085 | Houston, TX | 6.5 | 0.3 | 5.26 | 0.02 | 0.02 | 91 |
| 77026 | Houston, TX | 6.4 | 0.3 | 5.33 | 0.02 | 0.02 | 92 |
| 77873 | Richards, TX | 6.3 | 0.1 | 0.90 | 0.02 | 0.00 | 15 |
| 77048 | Houston, TX | 6.3 | 0.3 | 4.31 | 0.02 | 0.01 | 75 |
| 77051 | Houston, TX | 5.4 | 0.3 | 6.44 | 0.02 | 0.02 | 111 |
| 77534 | Danbury, TX | 5.3 | 0.1 | 1.72 | 0.02 | 0.00 | 30 |
| 77372 | Splendora, TX | 5.2 | 0.4 | 7.16 | 0.01 | 0.02 | 124 |
| 77485 | Wallis, TX | 4.7 | 0.6 | 13.25 | 0.01 | 0.03 | 229 |
| 77358 | New Waverly, TX | 4.6 | 0.2 | 3.54 | 0.01 | 0.01 | 61 |
| 77975 | Moulton, TX | 4.2 | 0.1 | 1.22 | 0.01 | 0.00 | 21 |
| 77545 | Fresno, TX | 4.0 | 0.1 | 3.68 | 0.01 | 0.01 | 64 |
| 77482 | Van Vleck, TX | 4.0 | 0.1 | 1.47 | 0.01 | 0.00 | 25 |
| 77982 | Port O Connor, TX | 3.9 | 0.0 | 0.86 | 0.01 | 0.00 | 15 |
| 77872 | North Zulch, TX | 3.8 | 0.2 | 4.20 | 0.01 | 0.01 | 73 |
| 75852 | Midway, TX | 3.6 | 0.0 | 1.22 | 0.01 | 0.00 | 21 |
| 77861 | Iola, TX | 3.4 | 0.2 | 5.93 | 0.01 | 0.01 | 103 |
| 77983 | Seadrift, TX | 3.1 | 0.3 | 9.25 | 0.01 | 0.01 | 160 |
| 77455 | Louise, TX | 3.0 | 0.2 | 7.74 | 0.01 | 0.01 | 134 |
| 77577 | Liverpool, TX | 2.8 | 0.4 | 15.84 | 0.01 | 0.02 | 274 |
| 77363 | Plantersville, TX | 2.7 | 0.1 | 2.10 | 0.01 | 0.00 | 36 |
| 77420 | Boling, TX | 2.7 | 0.0 | 1.78 | 0.01 | 0.00 | 31 |
| 77050 | Houston, TX | 2.6 | 0.0 | 0.77 | 0.01 | 0.00 | 13 |
| 77971 | Lolita, TX | 2.4 | 0.1 | 2.52 | 0.01 | 0.00 | 44 |
| 77457 | Matagorda, TX | 2.2 | 0.1 | 2.97 | 0.01 | 0.00 | 51 |
| 77419 | Blessing, TX | 2.2 | 0.1 | 2.37 | 0.01 | 0.00 | 41 |
| 78935 | Alleyton, TX | 2.1 | 0.0 | 2.05 | 0.01 | 0.00 | 35 |
| 77078 | Houston, TX | 2.1 | 0.2 | 11.23 | 0.01 | 0.01 | 194 |
| 78944 | Industry, TX | 1.9 | 0.0 | 2.32 | 0.01 | 0.00 | 40 |
| 77456 | Markham, TX | 1.7 | 0.2 | 13.93 | 0.00 | 0.01 | 241 |
| 77560 | Hankamer, TX | 1.6 | 0.1 | 5.46 | 0.00 | 0.00 | 94 |
| 78931 | Bleiblerville, TX | 1.6 | 0.0 | 2.02 | 0.00 | 0.00 | 35 |
| 77538 | Devers, TX | 1.4 | 0.2 | 16.58 | 0.00 | 0.01 | 287 |
| 77417 | Beasley, TX | 1.3 | 0.1 | 8.28 | 0.00 | 0.01 | 143 |
| 77444 | Guy, TX | 1.3 | 0.0 | 0.87 | 0.00 | 0.00 | 15 |
| 77433 | Cypress, TX | 1.2 | 0.0 | 4.05 | 0.00 | 0.00 | 70 |
| 77359 | Oakhurst, TX | 1.1 | 0.1 | 13.27 | 0.00 | 0.01 | 230 |
| 77432 | Danevang, TX | 1.0 | 0.0 | 0.00 | 0.00 | 0.00 | 0 |
| 77458 | Midfield, TX | 0.8 | 0.0 | 0.06 | 0.00 | 0.00 | 1 |
| 77483 | Wadsworth, TX | 0.6 | 0.0 | 1.60 | 0.00 | 0.00 | 28 |
| 77597 | Wallisville, TX | 0.5 | 0.0 | 1.82 | 0.00 | 0.00 | 31 |
| 77468 | Pledger, TX | 0.2 | 0.0 | 0.00 | 0.00 | 0.00 | 0 |
| 77507 | Pasadena, TX | 0.2 | 0.0 | 16.15 | 0.00 | 0.00 | 279 |
| 77440 | Elmaton, TX | 0.1 | 0.0 | 0.00 | 0.00 | 0.00 | 0 |
| TOTAL | | 34,616.1 | 2,000.7 | 5.78 | 100.00 | 100.00 | 100 |

_6,026,381_

FINANCIAL MARKET CLASSIFICATION SYSTEM

BACKGROUND OF THE INVENTION

1. Field of the Invention

This invention relates generally to financial information systems and, more specifically, to a system and method for classifying financial investments according to detailed information characterizing investment securities.

2. Related Art

Each time a security is offered, whether it is a new security or an additional new offering of an existing security, it is referred to as an "issue" in financial parlance. The issue may be in the form of a stock, bond, mutual fund or any other investment product. An investment position represents the number of shares or amount of assets invested in a specific issue. An investment account represents one or more investment positions owned by a single account.

As a method for tracking security issues, Standard & Poor's (S&P) provides a series of unique 8-digit alphanumeric values, one of which values may be acquired by the issuer of a security as a unique permanent identifier. This value is referred to as a Committee on Uniform Securities Identification Procedures number (CUSIP number). Publicly traded issues are identified by CUSIP numbers, and financial institutions maintain the CUSIP number on all applicable investment position records to identify the security owned.

The CUSIP number, by itself, does not provide sufficient information to identify the type of an issue. However, additional information pertaining to the issue can be researched and determined from its offering prospectus. Using this additional information, a security can be classified or grouped.

For example, contemporary financial institutions such as Merrill Lynch use categories to track the types of securities they sell. Each financial institution assigns securities to internally generated categories based on prospectus review. These internal categories are unique to each institution, and assignments are not necessarily consistently made, nor are the categories regularly updated. As a result, coding errors and errors of omission occur. Moreover, certain securities may have to be force-fit into inappropriate categories. A maintainable, verifiable, consistent method for making category assignments would overcome the above-stated problems and would permit cross-industry comparative analysis.

As another example, Lipper Analytical Services has developed a scheme, called Lipper Investment Objectives, which classifies a subset of securities, namely mutual funds (funds), according to each fund's portfolio mix, as specified in its prospectus. The Lipper Investment Objectives permit fund marketers to compare their proprietary funds with others that have similar portfolio mixes. The Wall Street Journal publishes the changes in performance of various categories of Lipper Investment Objectives in the Money and Investing section of its daily newspaper. Because this scheme is not based on CUSIP numbers, but rather issuer name and fund title, it does not permit financial institutions to classify investment positions.

There is a need, therefore, for a process that systematically classifies financial securities based on CUSIP number. Such a process should group investment products into both detailed and general categories such that users can identify narrowly-defined security types, as needed, but also re-combine standard detailed categories into custom product categories suitable to their specific purposes.

SUMMARY OF THE INVENTION

The present invention solves the above-stated problems by providing a systematic process for classifying investment positions based on CUSIP number. The present invention classifies investment securities using sets of hierarchical bucket codes based on the investment securities' CUSIP numbers and prospectus information.

A bucket is an investment product classification that uniquely and consistently identifies an investment product type. In the preferred embodiment, there are buckets to classify individual securities and mutual funds into security product types, asset classes and mutual fund types, herein referred to as product, asset and fund types. Thus, the present invention provides a standard classification system into which all investment securities can be categorized and grouped.

The present invention provides three sets of hierarchical investment product bucket codes that define a standard set of both general and detailed investment product buckets: a set of product buckets, a set of asset buckets, and a set of fund buckets. Each set of buckets is directed to a specific classification purpose. The present invention uses CUSIP numbers as the keys for classifying and aggregating investment products into these standard sets of product buckets, asset buckets and fund buckets.

In operation, the present invention receives a financial institution's client investment database in an internal format specific to the financial institution. The present invention parses the individual investment positions within each investment account and then reclassifies the individual investment positions, based on the CUSIP number, into product buckets, asset buckets, and fund buckets. In the preferred embodiment, the hierarchical bucket codes that make up each bucket provide both a general level and a detailed level of classification, thereby affording the financial institution flexible and vital information on its clients' investments.

The classifications generated by the present invention are extremely accurate for three reasons. First, they are derived from the financial institution's raw client data at the position level (i.e., the financial institution's data have not been pre-summarized). Since the financial institution does not pre-summarize the client data, there is no opportunity for the financial institution to introduce additional errors. Second, the classification of the position information is based upon the CUSIP number, resulting in consistent classification across multiple financial institutions. Third, the present invention performs error checking during the generation of the reclassification by verifying each bucket into which an investment position is assigned, as well as by verifying all combined investment positions in terms of buckets and amount of assets within each bucket.

The present invention also provides a financial institution with the ability to generate a custom security classification system based on the product, asset, and fund bucket codes. Once its investment positions have been reclassified, a financial institution may combine a plurality of bucket codes to generate a unique classification level specific to the internal needs of the financial institution.

The present invention also provides the ability to combine the reclassified investment positions of multiple financial institutions into an aggregate file. Using the aggregate file, a financial institution can determine the market of investment products at both general and detailed levels. The aggregated investment positions are also partitioned according to ZIP code, account type, account size, and account year. Therefore, each financial institution participating in the aggregate file can review its relative market share for selected investment products within a specific geographical area or classification of accounts.

Additional features of this invention will become apparent from the following detailed description of the best mode for carrying out the invention and from appended claims.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIGS. 20–24 illustrates how the present invention can be used for table analysis of the product of the present invention;

DETAILED DESCRIPTION OF THE PREFERRED EMBODIMENTS

Figure 1:
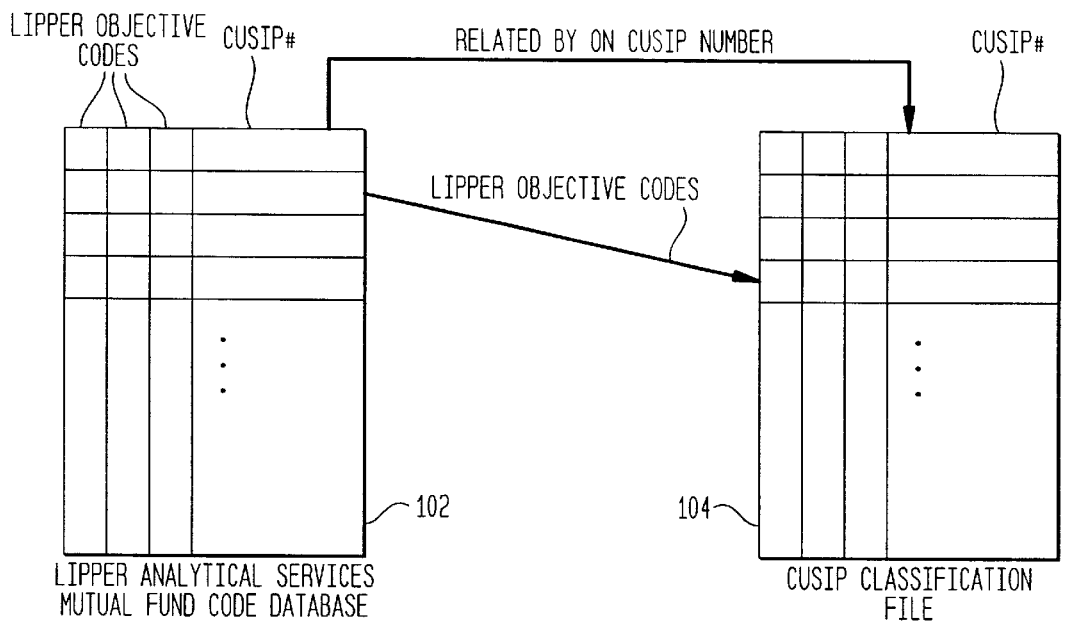
FIG. 1 illustrates the flow of Lipper Investment Objectives to the CUSIP classification file.

1. High Level Description of the System Implementation

The present invention is directed to the reclassification, based on CUSIP number, of investment products in an investment position file. It should be understood, however, that the present invention is equally applicable to CUSIP-identified financial information other than investment position data. Examples of other CUSIP-identified financial information are: mutual fund sales transactions, investment transactions, commission or revenue credits, etc.

An investment position represents the number of shares or amount of money invested in a specific security held in a specific account, owned by a specific entity. An investment product is a type of security such as a stock, bond, mutual fund, etc. An investment account represents one or more investment positions owned by a single entity.

Investment position information is collected from various financial institutions and is standardized by reclassifying the investment positions into standard buckets. The reclassification of investment positions into standard buckets allows the data of one financial institution to be analyzed with respect to the data of other financial institutions.

As an aid for tracking security issues, Standard & Poor's (S&P) provides a series of unique 8-digit alphanumeric values, one of which values may be acquired by the issuer of a security as a unique permanent identifier. This value is referred to as a Committee on Uniform Securities Identification Procedures number (CUSIP number). Interactive Data Corporation (IDC) compiles CUSIP numbers and their associated prospectus information into a CUSIP data file. The present invention uses IDC prospectus information to classify each CUSIP number into a bucket.

Additional prospectus information for an investment product can be added based on CUSIP number. For example, the IDC CUSIP data file does not provide detailed prospectus information for mutual fund investment products. Lipper Analytical Services provides a categorization of mutual funds called Lipper Investment Objectives. In the present invention a database is used to associate a Lipper Investment Objective to each mutual fund based on CUSIP number. By using both the IDC CUSIP data file and Lipper Investment Objectives, related by CUSIP, a more complete and detailed reclassification of investment products and of a financial institution's position database is attained. Although the preferred embodiment uses Lipper Analytical Service's categorization of mutual funds, in alternative implementations of the present invention other mutual fund categorizations could be used in addition to, or in place of, Lipper Investment Objectives, such as those provided by other firms, such as Strategic Insights and Morningstar.

The present invention uses the CUSIP number as the key to reclassifying the investment position data into buckets. A bucket is an investment product classification that uniquely and consistently identifies an investment product type. A bucket comprises bucket codes that collectively identify the bucket. Appendix pages B1–B16 illustrate the preferred embodiment of the buckets and associated bucket codes. In the preferred embodiment, there are buckets to classify individual securities and mutual funds into security product types, asset classes and mutual fund types, hereinafter referred to as product, asset and fund types. In an alternative embodiment, securities could be classified into other buckets, such as market capitalization levels. Once a security issue associated with a CUSIP number has been recoded with bucket codes, any occurrence of that CUSIP number (and the associated security issue) can be recoded with bucket codes.

The preferred embodiment comprises three sets of buckets, one set each for product, asset and fund types. Each bucket comprises bucket codes which provide multiple levels of detail categorizing a particular investment product type. For example, fund buckets comprise three levels of detail. The first level is the most general level, and the second and third levels are successively more detailed. In the preferred embodiment, the first level fund bucket code specifies whether the investment product is a money market fund, municipal bond fund, domestic taxable bond fund, a blended debt/equity fund, domestic equity fund or an international fund. The second level fund bucket code specifies greater detail about the mutual fund. Second level fund bucket codes may specify, for example, whether a particular money market fund invests in taxable or tax-exempt securities. The third level bucket code for a fund bucket is even more detailed than the first two levels, yielding more information about the investment product. Third level fund bucket codes may specify, for example, whether a tax-exempt money market fund invests a single state's municipal bonds, or many states' municipal bonds. These varying levels of detail enable the classification of individual investment products at both a general level and a detailed level.

FIGS. 1–4 provide an overview of the flow of data through the present invention. These figures illustrate how the bucket codes and data are manipulated to yield a position database file with the standard buckets assigned to each position.

FIG. 1 illustrates how the Lipper Investment Objectives are assigned to investment products in the CUSIP classification file 104. The database derived from Lipper Analytical Services mutual fund information (Lipper database 102) comprises multiple records, each of which represents an individual mutual fund. Each unique mutual fund investment product has a corresponding CUSIP number. The Lipper database 102 comprises records and CUSIP numbers representing mutual fund investment products. The CUSIP classification file 104, on the other hand, comprises all known CUSIP numbers. The Lipper database 102, therefore, is a subset of the investment products represented by the records of the CUSIP classification file 104. The Lipper database 102, however, comprises more detailed prospectus information on mutual fund investment products than the CUSIP classification file 104. The more detailed prospectus information is in the form of Lipper Investment Objectives. To include the detailed prospectus information of the Lipper database 102 in the reclassification of investment products, the Lipper Investment Objectives are copied into the CUSIP classification file 104.

To copy the Lipper Investment Objectives into the CUSIP classification file 104, the Lipper database 102 is related into (mapped into) the CUSIP classification file 104 based on matching CUSIP numbers. Since CUSIP numbers uniquely identify an investment product, the mutual fund investment products of the Lipper database 102 map directly into the CUSIP classification file 104. The Lipper Investment Objectives are then copied into the corresponding mutual fund investment product records of the CUSIP database.

Figure 2:
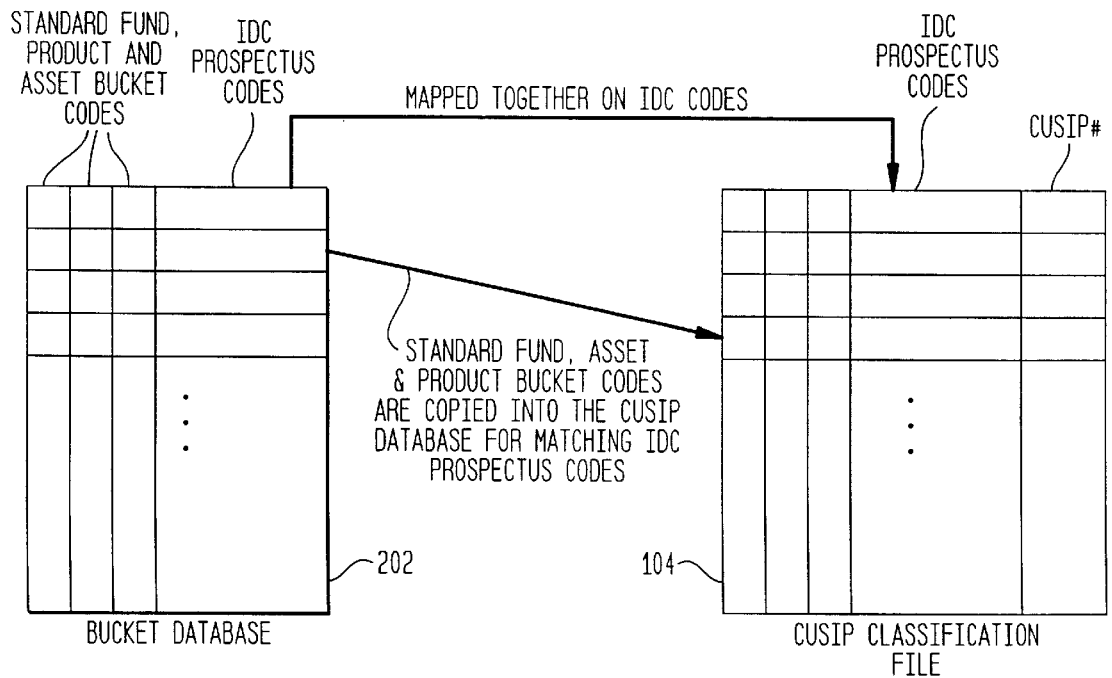
FIG. 2 illustrates the flow of product, fund and asset bucket codes from a bucket database to the CUSIP classification file.

FIG. 2 illustrates the flow of data used to assign product, asset and fund buckets to the investment products of the CUSIP classification file 104 after the Lipper prospectus information has been added to the CUSIP classification file 104. The bucket database 202 comprises all of the buckets to be assigned to investment products, as well as every unique combination of IDC prospectus information & Lipper Investment Objectives that occur in the CUSIP classification file 104. The bucket database 202 is a look up table used to cross reference bucket codes with IDC & Lipper prospectus codes, and can be generated either manually or algorithmically. Each particular combination of IDC & Lipper prospectus codes is associated with a individual bucket. The bucket database 202 is mapped into the CUSIP classification file 104 based on IDC prospectus information & Lipper Investment Objective combinations. The product, asset, and fund bucket codes are then copied into the CUSIP classification file 104. After the bucket codes have been copied into the CUSIP classification file 104, each unique investment product, identified by CUSIP number, has been assigned uniquely to one product bucket, one asset bucket and one fund bucket. The CUSIP classification file 104 can now be used to assign buckets to investment products which are identified by CUSIP number. The method of assigning product, asset and fund bucket codes to the CUSIP classification file 104 is implementation specific. Although the process of FIG. 2 illustrates the use of a look-up table, the bucket codes could also be assigned using an algorithm or applied manually.

Figure 3:
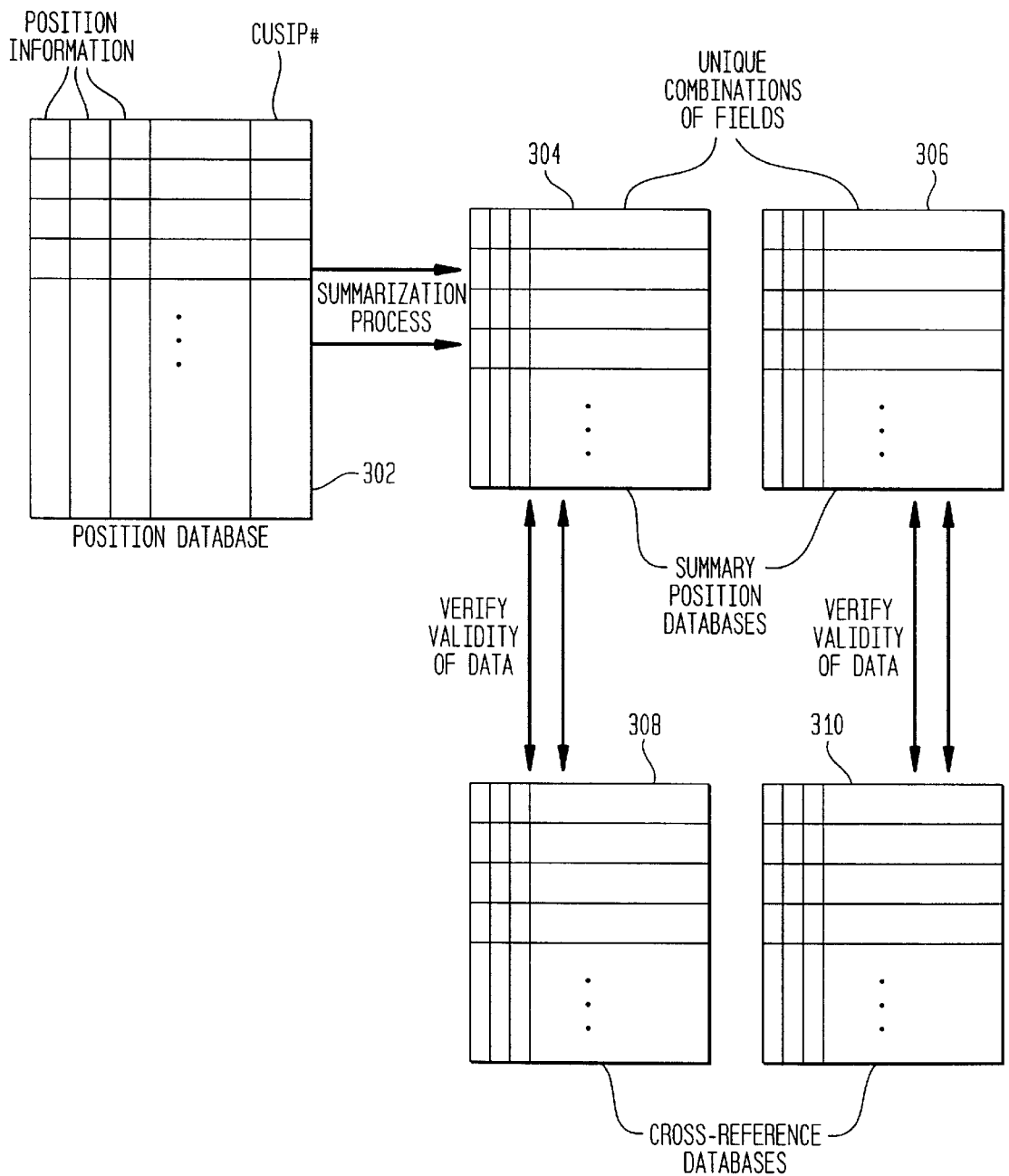
FIG. 3 illustrates the summarization process for position database data verification.

FIG. 3 illustrates the process for verifying and auditing the information in the position database 302 for the purposes of quality control. Since the position database 302 is supplied by an external financial institution, the information in the position database is subject to errors. The summarization process identifies unique combinations of position information and creates summary databases 304, 306 whose records each represent a unique combination of position information values. In the preferred embodiment, the position information is in the form of field values in position database 302. The position database 302 can be summarized multiple times based on different fields or combinations of fields. The summarization process is most easily understood with a simple example.

The summary process is readily described in terms of an example database that contains the name of the owner, ZIP code and dialing prefix of every phone number in the United States. This hypothetical database would contain approximately 275 million records. If the number of individuals in each ZIP code is to be calculated, the database can be verified by "summarizing" on ZIP code. The summarization process would result in a ZIP code summary database with each record containing a unique ZIP code and a number representing the number of phone numbers in the particular ZIP code. Since the U.S. has approximately 35 thousand unique ZIP codes, the ZIP code summary database would have approximately 35 thousand records. The ZIP code summary database could then be checked for validity against a list of known valid ZIP codes to identify the invalid ZIP codes in the example database. This summary process, therefore, provides a method for data verification.

More reliable data verification can be performed by summarizing on combinations of fields. Since valid ZIP codes could be assigned to phones residing in another ZIP code, more reliable data verification can be performed by applying the summary process to ZIP code combined with telephone dialing prefix. A new summary database is created by creating a record for each occurrence of a unique ZIP code and telephone dialing prefix combination. This would result in a database that contains every unique combination of ZIP code and telephone dialing prefix. The resultant summary database could then be cross-referenced against a list of known valid combinations of ZIP code and dialing prefix, providing an additional level of data verification.

FIG. 3 illustrates the summarization process as applied to the financial institution's position database 302. The summarization process is used as a quality control step to ensure the validity of the data provided by the financial institution. The position database 302 is summarized on unique combinations of fields, for example, ZIP code, state, account type, CUSIP number, etc. The summarization process results in summary position databases 304, 306. Summary position databases 304, 306 are then cross-reference checked for validity against known valid combinations of information in cross-reference databases 308, 310. Any errant data or new unidentified combinations of data are identified, flagged and removed from the position database 302 or added to the cross-reference databases 308, 310, respectively. This step ensures the integrity and validity of the position database 302 information.

Figure 4:
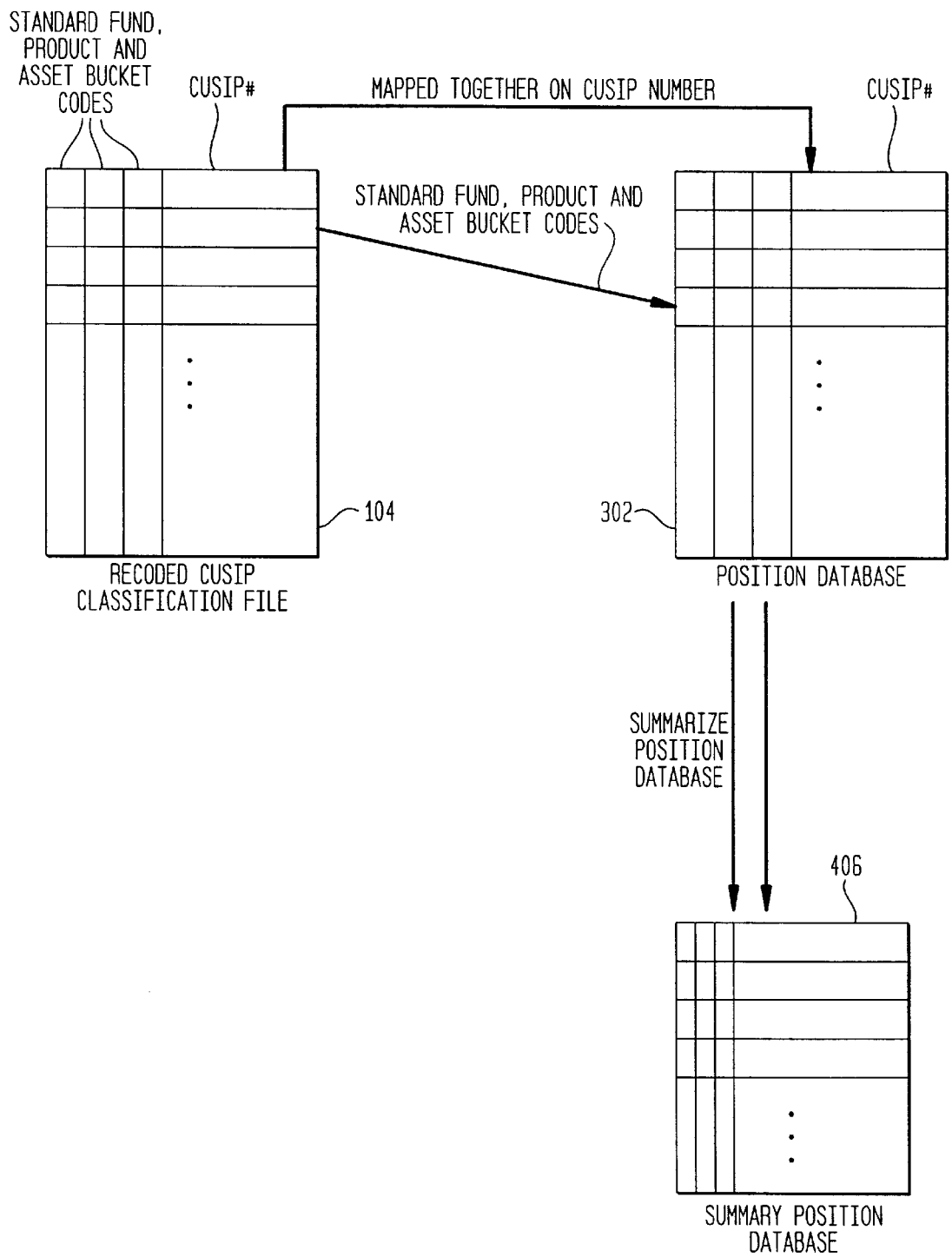
FIG. 4 illustrates the flow of fund, product and asset bucket codes from the CUSIP classification file to a position database.

FIG. 4 illustrates the process of recoding the financial institution's position database 302 with the bucket codes from the recoded CUSIP classification file 104 and summarizing position database 302. Position database 302 is related (mapped) to CUSIP classification file 104 based on CUSIP number. The bucket codes are then copied from the CUSIP classification file 104 into position database 302 for each matching CUSIP number. This process results in position database 302 that contains each investment position placed in product, asset and fund buckets identifying the investment product type. After position database 302 has been recoded with the bucket codes, position database 302 is then summarized. The summary process in the preferred embodiment is performed on the basis of unique bucket and ZIP codes. The number of positions and values of assets are totaled for each unique combination of bucket and ZIP code. This results in a database whose records contain a list of each possible bucket (that occurs in the ZIP code) for every ZIP code which has investment positions, with its associated assets and number of positions.

2. Sample Data

Tables A through F contain the input data specifications for the financial institution submitted position data information, which varies according to the type of financial institution. Tables A, C, and F provide an overview of the data to be submitted by the financial institution for three types of financial institutions. The position information of the preferred embodiment comprises ZIP code, customer type, customer gender, branch, customer age, customer date, account type, fund or product identifier, CUSIP, account date, shares owned, price of security, account balance, distributor identifier, distributor type and omnibus account indicator. Each record of the data provided by the financial institution should represent one position. Tables B, D, and E describe the cross-reference tables to be provided by the financial institution.

TABLE A

INPUT DATA SPECIFICATIONS SUMMARY
Data as of 6/28/96 -- Direct-Marketed Fund Companies

| | |
|---|---|
| Data Selection: | Select all investment positions of retail accounts administered in the U.S. (This is to include all accounts of Private Investors, Small Businesses, and small Group Plans that your firm considers part of the "retail" market.) |
| Level of Detail: | Provide one record for each shareholder account. |
| Data Security: | Strip out all personal identifiers (e.g., name, address, tel/fax#, taxpayer ID) |
| Record Content: | |
| ZIP+4 Code (required) | Account owner's ZIP+4 |
| Distributor Code (required) | Your code for any independent broker/dealer or financial advisor who is responsible for the account. |
| Branch Code (optional) | Your code for any of your field offices linked to the account. |
| Customer Type (required) | Type of account owner (see Code Definition Tables). |
| Customer Gender (optional) | Where applicable. |
| Customer Age (optional) | Date or year of birth, where applicable. |
| Customer Date (optional) | Date or year relationship established with the Customer. |
| Unique Acct. # (optional) | Unique identifier for each account (to facilitate error checks). |
| Account Type (required) | Type of account (see Code Definition Tables). |
| Account Date (required) | Date or year account established. |
| Fund Code (required) | Your internal code for the Fund. |
| Shares/Units Owned (req'd) | Number shares/units owned, as of 6/28/96, to 3 decimals. |
| Market Price/NAV (req'd) | Price or NAV, as of 6/28/96, reported to 3 decimals. |
| Balance (required) | Asset amount, as of 6/28/96, reported to 2 decimals. |
| Code Conventions: | Please use the same codes you use internally for all data fields. Please do not recode, convert, or roll-up any of your internal codes before submission. |
| File Characteristics: | Please provide field-length records in a single file (maximum block size = 32K). Record separators may be used for ASCII files. Do not convert any EBCDIC binary fields. |
| File Documentation: | Please provide documentation; including: record layout, block size, blocking factor, total number of records and dollars of assets submitted. |
| Preferred Medium: | 3480/3490 cartridges or Windows NT DAT tape back-up versions. |

TABLE B

CODE DEFINITION TABLES
Instructions for Direct-Marketed Fund Companies

Please provide a table of possible code values and their associated definitions in a common PC format such as Excel, DBF, or ASCII text file format for all of the following codes:

1. Codes used to define Customer Types, for example:

| Customer Type Code | Customer Type Definition |
   |---|---|
   | IN | Individual |
   | JT | Joint Tenants |
   | CO | Corporation |

2. Codes used to define Account Types, for example:

| Account Type Code | Account Type Definition |
   |---|---|
   | REG | Regular |
   | WRA | Wrap |
   | 401 | 401(k) Individually Directed |
   | IRR | IRA Regular |

3. Codes used to identify your company's individual funds, for example:

| Fund Code | Fund Name | CUSIP |
   |---|---|---|
   | TMM | Taxable Money Market Fund | 123456701 |
   | CMS-B | Common Stock Fund-B Shares | 123456802 |

4. Codes used to identify your company's field branch offices. Please include all branch address information as well as any management hierarchy that applies, for example:

| Branch | Region | Name | Address | City | State | Zip |
   |---|---|---|---|---|---|---|
   | AZ | SW | Phoenix | 16 West Pasadena | Phoenix | AZ | 80712 |
   | CH | MW | Chicago | 20 West Wacker | Chicago | IL | 60602 |

5. Codes used to identify your company's independent distributors. Please include all distributor name and address information, for example:

| Dealer | Name | Address | City | State | Zip |
   |---|---|---|---|---|---|
   | AZ | Arizona Financial Planners | 16 West Pasadena | Phoenix | AZ | 80712-1003 |
   | CH | CHH Group | 20 West Wacker | Chicago | IL | 60602-8973 |

TABLE C

INPUT DATA SPECIFICATIONS SUMMARY
Data as of 6/28/96 -- Wholesale-Marketed Fund Companies

| | |
|---|---|
| Data Selection: | Select all investment positions of retail accounts administered in the U.S. (This is to include all accounts of Private Investors, Small Businesses, and small Group Plans that your firm considers part of the retail market.) |
| Level of Detail: | Provide one record for each shareholder account. |
| Data Security: | Strip out all personal identifiers (e.g., name, address, tel/fax#, taxpayer ID) |
| Record Content: | |
| ZIP+4 Code (required) | Account owner's ZIP+4 |
| Distributor Code (required) | Your code for any independent broker/dealer or financial advisor who is responsible for the account. |
| Distributor Type (required): | Your code for the type of broker/dealer or financial advisor. |
| Omnibus Acct. Indicator (required) | Your code indicating omnibus accounts |
| Customer Type (required) | Type of account owner (see Code Definition Tables). |
| Customer Gender (optional) | Where applicable. |
| Customer Age (optional) | Date or year of birth, where applicable. |
| Customer Date (optional) | Date or year relationship established with the Customer. |
| Unique Acct. # (optional) | Unique identifier for each account (to facilitate error checks). |
| Account Type (required) | Type of account (see Code Definition Tables). |
| Account Date (required) | Date or year account established. |
| Fund Code (required) | Your internal code for the Fund. |
| Shares/Units Owned (req'd) | Number shares/units owned, as of 6/28/96, to 3 decimals. |
| Market Price/NAV (req.'d) | Price or NAV, as of 6/28/96, reported to 3 decimals. |
| Balance (required) | Asset amount, as of 6/28/96, reported to 2 decimals. |
| Code Conventions: | Please use the same codes you use internally for all data fields. Please do not recode, convert, or roll-up any of your internal codes before submission. |
| File Characteristics: | Please provide field-length records in a single file (maximum block size 32K). Record separators may be used for ASCII files. Do not convert any EBCDIC binary fields. |
| File Documentation: | Please provide documentation, including: record layout, block size, blocking factor, total number of records and dollars of assets submitted. |
| Preferred Medium: | 3480/3490 cartridges or Windows NT DAT tape back-up versions. |

TABLE D

CODE DEFINITION TABLES
Instructions for Wholesale-Marketed Fund Companies

Please provide a table of possible code values and their associated definitions in a common PC format such as Excel, DBF, or ASCII text file format for all of the following codes:

1. Code(s) used to define Customer Types, for example:

| Customer Type Code | Customer Type Definition |
   | --- | --- |
   | IN | Individual |
   | JT | Joint Tenants |
   | CO | Corporation |

2. Code(s) used to define Account Types, for example:

| Account Type Code | Account Type Definition |
   | --- | --- |
   | REG | Regular |
   | WRA | Wrap |
   | 401 | 401(k) Individually Directed |
   | IRR | IRA Regular |

3. Codes used to identify your company's individual funds, for example:

| Fund Code | Fund Name | CUSIP |
   | --- | --- | --- |
   | TMM | Taxable Money Market Fund | 123456701 |
   | CMS | Common Stock Fund | 123456802 |

4. Codes used to identify your company's independent distributors. Please include all distributor name and address information, for example:

| Dealer | Name | Address | City | State | Zip |
   | --- | --- | --- | --- | --- | --- |
   | AZ | Arizona Financial Planners | 16 West Pasadena | Phoenix | AZ | 80712-1003 |
   | CH | CHH Group | 20 West Wacker | Chicago | IL | 60602-8973 |
   | ML | Merrill Lynch | 800 Scudders Mill Rd. | Plainsboro | NJ | 08536 |

5. Code(s) used to define your company's types of distributors, for example:

| Distributor Type Code | Distributor Type Name |
   | --- | --- |
   | NWH | National Brokerage House |
   | FP | Financial Planner |
   | INS | Insurance Company |

TABLE E

INPUT DATA SPECIFICATIONS SUMMARY
Data as of 6/28/96 -- Securities Brokers

| | |
| --- | --- |
| Data Selection: | Select all investment positions of retail accounts administered in the U.S. (This is to include all accounts of Private Investors, Small Businesses, and small Group Plans that your firm considers part of the "wholesale" market.) |
| Level of Detail: | Provide one record for each investment position. |
| Data Security: | Strip out all personal identifiers (e.g., name, address, tel/fax#, taxpayer ID) |
| Record Content: | |
| ZIP+4 Code (required) | Account owner's ZIP+4 |
| Branch Code (required) | Your code for the originating branch, as applicable. |
| Non-Branch Dist. Code (required) | Your internal code for any advisor account relationships or fully disclosed clearing branches. |
| Customer Type (required) | Type of account owner (see Code Definition Tables). |
| Customer Gender (optional) | Where applicable. |
| Customer Age (optional) | Date or year of birth, where applicable. |
| Unique Acct. # (optional) | A unique identifier for each account. |
| Account Type (required) | Type of account (see Code Definition Tables). |
| Account Date (required) | Date or year account established. |
| Record Type (required) | 1 = Cash Record; 2 = Position Record. |
| Product Code (required) | Finest level code in your internal product code system. |
| CUSIP ® (required) | Leave blank for Cash or Margin (or if CUSIP ® is not available). |

TABLE E-continued

INPUT DATA SPECIFICATIONS SUMMARY
Data as of 6/28/96 -- Securities Brokers

| | |
|---|---|
| Shares/Units Owned (req'd) | Number shares/units owned, as of 6/28/96, to 3 decimals. |
| Market Price/NAV (req'd) | Price or NAV, as of 6/28/96, reported to 3 decimals. |
| Balance (required) | Asset Amount, as of 6/28/96, reported to 2 decimals. Please report all positions, regardless of sign. |
| Code Conventions: | Please use the same codes you use internally for all data fields. Please do not recode, convert, or roll-up any of your internal codes before submission. |
| File Characteristics: | Please provide field-length records in a single file (maximum block size = 32K). Record separators may be used for ASCII files. Do not convert any EBCDIC binary fields. |
| File Documentation: | Please provide documentation, including: record layout, block size, blocking factor, total number of records and dollars of assets submitted. |
| Preferred Medium: | 3480/3490 cartridges or Windows NT DAT tape back-up versions. |

TABLE F

CODE DEFINITION TABLES
Instructions for Securities Brokers

Please provide a table of possible code values and their associated definitions in a common PC format such as Excel, DBF, or ASCII text file format for all of the following codes:

1. Codes used to define Customer Types, for example:

| Customer Type Code | Customer Type Definition |
|---|---|
| IN | Individual |
| JT | Joint Tenants |
| CO | Corporation |

2. Codes used to define Account Types, for example:

| Account Type Code | Account Type Definition |
|---|---|
| REG | Regular |
| WRA | Wrap |
| 401 | 401(k) Individually Directed |
| IRR | IRA Regular |

3. Codes used to identify products in your company's product code system, for example:

| Product Code | Product Name |
|---|---|
| TMM | Taxable Money Market Funds |
| CMS | Common Stock |

4. Codes used to identify your company's field branch offices. Please include all branch address information as well as any management hierarchy that applies, for example:

| Branch | Region | Name | Address | City | State | Zip |
|---|---|---|---|---|---|---|
| AZ | SW | Phoenix | 16 West Pasadena | Phoenix | AZ | 80712 |
| CH | MW | Chicago | 20 West Wacker | Chicago | IL | 60602 |

5. Codes used to identify your company's non-branch distributors, if any. Please include all distributor name and address information, for example:

| Dealer | Name | Address | City | State | Zip |
|---|---|---|---|---|---|
| AZ | Arizona Financial Planners | 16 West Pasadena | Phoenix | AZ | 80712-1003 |
| CH | CHH Group | 20 West Wacker | Chicago | IL | 60602-8973 |

Tables 1 through 3 of the Appendix contain three tables describing the preferred embodiment bucket code information. The three tables describe the different product, fund and asset buckets. Although the tables illustrate the preferred embodiment, due to the nature of the investment product industry, new product, fund and asset bucket codes will continue to be added, and existing bucket codes modified. Table 1 contains a list of the buckets describing the product bucket code information. The product bucket codes of Table 1 are used to recode the CUSIP classification file 104 which, in turn, is used to recode the financial institution's position database. Table 2 and Table 3 contain the asset and fund bucket codes, respectively. The asset bucket codes are used to establish a series of asset classes. These asset classes are derived from the combination of fund and product bucket codes assigned to an investment product. The CUSIP classification file 104, therefore, cannot be recoded with the asset bucket codes until the product and fund bucket codes have been assigned to the investment products in the CUSIP classification file 104. After the fund and product bucket codes have been assigned to each investment product in the CUSIP database, the combination of fund and product bucket codes for each investment product are analyzed to determine the appropriate asset bucket code to be assigned to the investment product. After the recoding process, the CUSIP classification file 104 contains a list of investment products recoded with the product, asset and fund bucket codes from Tables 1, 2 and 3. The recoded CUSIP classification file 104 can then be used to place all of the investment products in a financial institution's position database in investment product buckets.

TABLE 1

Product Codes

Bucket Codes

| Prod 1 | Prod 2 | Prod 3 | ProdName 1 | ProdName 2 | ProdName 3 |
|---|---|---|---|---|---|
| 1 | 0 | 0 | Cash | | |
| 1 | 1 | 0 | Cash | Cash Balances | |
| 1 | 1 | 1 | Cash | Cash Balances | Cash Balances |
| 1 | 2 | 0 | Cash | Money Market Funds | |
| 1 | 2 | 1 | Cash | Money Market Funds | Taxable |
| 1 | 2 | 2 | Cash | Money Market Funds | Tax-Exempt |
| 2 | 0 | 0 | Munis | | |
| 2 | 1 | 0 | Munis | Tax-Exempt | |
| 2 | 2 | 0 | Munis | Taxable | |
| 2 | 3 | 0 | Munis | Zero-Coupon | |
| 3 | 0 | 0 | Dom. FI | | |
| 3 | 1 | 0 | Dom. FI | US Savings Bonds | |
| 3 | 2 | 0 | Dom. FI | Treasuries | |
| 3 | 2 | 1 | Dom. FI | Treasuries | Bills |
| 3 | 2 | 2 | Dom. FI | Treasuries | Notes |
| 3 | 2 | 3 | Dom. FI | Treasuries | Bonds |
| 3 | 3 | 0 | Dom. FI | US Gov't Zero Coupon Bonds | |
| 3 | 3 | 1 | Dom. FI | US Gov't Zero Coupon Bonds | Treasury Strips |
| 3 | 3 | 2 | Dom. FI | US Gov't Zero Coupon Bonds | Other Zero Coupons |
| 3 | 4 | 0 | Dom. FI | Federal Agency Debt | |
| 3 | 5 | 0 | Dom. FI | Mortgage-Backed Securities | |
| 3 | 5 | 1 | Dom. FI | Mortgage-Backed Securities | GNMA |
| 3 | 5 | 2 | Dom. FI | Mortgage-Backed Securities | FNMA |
| 3 | 5 | 3 | Dom. FI | Mortgage-Backed Securities | FHLMC |
| 3 | 5 | 4 | Dom. FI | Mortgage-Backed Securities | Other Issuers |
| 3 | 6 | 0 | Dom. FI | CMOs | |
| 3 | 7 | 0 | Dom. FI | Asset-Backed Securities | |
| 3 | 8 | 0 | Dom. FI | CDs | |
| 3 | 9 | 0 | Dom. FI | Corporates | |
| 3 | 9 | 1 | Dom. FI | Corporates | Commercial Paper |
| 3 | 9 | 2 | Dom. FI | Corporates | Notes & Bonds |
| 3 | 9 | 3 | Dom. FI | Corporates | Zero Coupons |
| 3 | 9 | 4 | Dom. FI | Corporates | Convertibles |
| 3 | 9 | 5 | Dom. FI | Corporates | Type Not Specified |
| 4 | 0 | 0 | Dom. Equity | | |
| 4 | 1 | 0 | Dom. Equity | Preferred Stock | |
| 4 | 1 | 1 | Dom. Equity | Preferred Stock | Regular |
| 4 | 1 | 2 | Dom. Equity | Preferred Stock | Convertible |
| 4 | 2 | 0 | Dom. Equity | Common Stock | |
| 4 | 2 | 1 | Dom. Equity | Common Stock | NYSE/AMEX Exchanges |
| 4 | 2 | 2 | Dom. Equity | Common Stock | NASDAQ-Listed |
| 4 | 2 | 3 | Dom. Equity | Common Stock | Regional Exchanges |
| 4 | 2 | 4 | Dom. Equity | Common Stock | OTC & NQB |
| 4 | 2 | 5 | Dom. Equity | Common Stock | Canadian Exchanges |
| 4 | 2 | 6 | Dom. Equity | Common Stock | Exchange Not Specified |
| 4 | 3 | 0 | Dom. Equity | Other Equities | |
| 4 | 3 | 1 | Dom. Equity | Other Equities | Warrants |
| 4 | 3 | 2 | Dom. Equity | Other Equities | Units |
| 4 | 3 | 3 | Dom. Equity | Otber Equities | Rights |
| 4 | 3 | 4 | Dom. Equity | Other Equities | Scrip |
| 4 | 3 | 5 | Dom. Equity | Other Equities | Other |
| 5 | 0 | 0 | O/E Funds | | |
| 5 | 1 | 0 | O/E Funds | Debt-Oriented | |
| 5 | 2 | 0 | O/E Funds | Equity-Oriented | |
| 6 | 0 | 0 | C/E Funds & Trusts | | |
| 6 | 1 | 0 | C/E Funds & Trusts | Closed-End Mutual Funds | |
| 6 | 1 | 1 | C/E Funds & Trusts | Closed-End Mutual Funds | Debt-Oriented |
| 6 | 1 | 2 | C/E Funds & Trusts | Closed-End Mutual Funds | Equity-Oriented |

TABLE 1-continued

Product Codes

Bucket Codes

| Prod 1 | Prod 2 | Prod 3 | ProdName 1 | ProdName 2 | ProdName 3 |
|---|---|---|---|---|---|
| 6 | 2 | 0 | C/E Funds & Trusts | UITs | B11 |
| 6 | 2 | 1 | C/E Funds & Trusts | UITs | Debt |
| 6 | 2 | 2 | C/E Funds & Trusts | UITs | Equity |
| 6 | 3 | 0 | C/E Funds & Trusts | REITs | |
| 6 | 4 | 0 | C/E Funds & Trusts | Other Funds/Trusts/MLPs | |
| 7 | 0 | 0 | Foreign | | |
| 7 | 1 | 0 | Foreign | Foreign Debt Issues | |
| 7 | 1 | 1 | Foreign | Foreign Debt Issues | US Exchanges |
| 7 | 1 | 2 | Foreign | Foreign Debt Issues | Canadian Exchanges |
| 7 | 1 | 3 | Foreign | Foreign Debt Issues | Exchange Not Specified |
| 7 | 2 | 0 | Foreign | Foreign Equity Issues | |
| 7 | 2 | 1 | Foreign | Foreign Equity Issues | ADRs |
| 7 | 2 | 2 | Foreign | Foreign Equity Issues | US Exchanges (Non-ADRs) |
| 7 | 2 | 3 | Foreign | Foreign Equity Issues | Canadian Exchanges |
| 7 | 2 | 4 | Foreign | Foreign Equity Issues | Exchange Not Specified |
| 7 | 3 | 0 | Foreign | Off-Shore Funds/Trusts | |
| 7 | 4 | 0 | Foreign | Other Foreign Securities | |
| 7 | 4 | 1 | Foreign | Other Foreign Securities | Private Placements |
| 7 | 4 | 2 | Foreign | Other Foreign Securities | Options/Futures |
| 7 | 4 | 3 | Foreign | Other Foreign Securities | Other |
| 8 | 0 | 0 | Other | | |
| 8 | 1 | 0 | Other | Private Limited Partnership | |
| 8 | 2 | 0 | Other | Private Placements | |
| 8 | 3 | 0 | Other | Options (on) | |
| 8 | 3 | 1 | Other | Options (on) | Equity Issues |
| 8 | 3 | 2 | Other | Options (on) | Debt Issues |
| 8 | 3 | 3 | Other | Options (on) | Interest Rates |
| 8 | 3 | 4 | Other | Options (on) | Indices |
| 8 | 3 | 5 | Other | Options (on) | Commodities |
| 8 | 3 | 6 | Other | Options (on) | Currencies |
| 8 | 4 | 0 | Other | Futures | |
| 8 | 4 | 1 | Other | Futures | Regular |
| 8 | 4 | 2 | Other | Futures | Managed Funds |
| 8 | 5 | 0 | Other | Precious Metals | |
| 8 | 6 | 0 | Other | Physical Commodities | |
| 8 | 7 | 0 | Other | Other | |
| 8 | 8 | 0 | Other | Unclassified Assets | |
| M | M | M | Margin Balances | | |

TABLE 2

Asset Codes

Bucket Codes

| Asst 1 | Asst 2 | Asst 3 | AsstName 1 | AsstName 2 | AsstName 3 |
|---|---|---|---|---|---|
| 1 | 1 | 0 | Cash | Cash Balances | |
| 1 | 2 | 0 | Cash | Tax-Ex Money Mkt Funds | |
| 1 | 3 | 1 | Cash | Taxable Money Mkt Funds | US Treasury |
| 1 | 3 | 2 | Cash | Taxable Money Mkt Funds | US Gov't |

TABLE 2-continued

Asset Codes

Bucket Codes

| Asst 1 | Asst 2 | Asst 3 | AsstName 1 | AsstName 2 | AsstName 3 |
|---|---|---|---|---|---|
| 1 | 3 | 3 | Cash | Taxable Money Mkt Funds | Other |
| 2 | 1 | 1 | Debt | US Treasury | 0–90 Days |
| 2 | 1 | 2 | Debt | US Treasury | 91–364 Days |
| 2 | 1 | 3 | Debt | US Treasury | 1 Yr. + |
| 2 | 2 | 1 | Debt | Other US Gov't | 0–90 Days |
| 2 | 2 | 2 | Debt | Other US Gov't | 91–364 Days |
| 2 | 2 | 3 | Debt | Other US Gov't | 1 Yr. + |
| 2 | 3 | 1 | Debt | Other Dom. Taxable Debt | 0–90 Days |
| 2 | 3 | 2 | Debt | Other Dom. Taxable Debt | 91–364 Days |
| 2 | 3 | 3 | Debt | Other Dom. Taxable Debt | 1 Yr. + |
| 2 | 4 | 1 | Debt | Foreign Issuer Debt | 0–90 Days |
| 2 | 4 | 2 | Debt | Foreign Issuer Debt | 91–364 Days |
| 2 | 4 | 3 | Debt | Foreign Issuer Debt | 1 Yr. + |
| 2 | 5 | 1 | Debt | Tax-Exempt Munis | 0–90 Days |
| 2 | 5 | 2 | Debt | Tax-Exempt Munis | 91–364 Days |
| 2 | 5 | 3 | Debt | Tax-Exempt Munis | 1 Yr. + |
| 2 | 6 | 1 | Debt | Debt Funds & Trusts | US Treasury |
| 2 | 6 | 2 | Debt | Debt Funds & Trusts | US Gov't |
| 2 | 6 | 3 | Debt | Debt Funds & Trusts | Ultra-Short Obligations |
| 2 | 6 | 4 | Debt | Debt Funds & Trusts | Other Dom. Taxable |
| 2 | 6 | 5 | Debt | Debt Funds & Trusts | Muni Bond |
| 2 | 6 | 6 | Debt | Debt Funds & Trusts | International |
| 2 | 7 | 0 | Debt | Expired Maturities | |
| 3 | 1 | 0 | Equity | Domestic Equities | |
| 3 | 2 | 1 | Equity | Equity Funds & Trusts | Domestic |
| 3 | 2 | 2 | Equity | Equity Funds & Trusts | International |
| 3 | 3 | 0 | Equity | Foreign Issuer Equities | |
| 3 | 4 | 0 | Equity | Foreign Off-Shore Funds | |
| 4 | 1 | 0 | Non-Classified | Foreign Other | |
| 4 | 2 | 0 | Non-Classified | Other Securities | |
| 4 | 3 | 0 | Non-Classified | Non-Classified Funds | |
| M | M | M | Margin Balances | | |

TABLE 3

Fund Codes

Bucket Codes

| Fund 1 | Fund 2 | Fund 3 | FundName 1 | FundName 2 | FundName 3 |
|---|---|---|---|---|---|
| 1 | 0 | 0 | Money Mkts | | |
| 1 | 1 | 0 | Money Mkts | Taxable | |
| 1 | 1 | 1 | Money Mkts | Taxable | US Treasury |
| 1 | 1 | 2 | Money Mkts | Taxable | US Gov't |
| 1 | 1 | 3 | Money Mkts | Taxable | Mony Mkt Instrument |
| 1 | 2 | 0 | Money Mkts | Municipal | |
| 1 | 2 | 1 | Money Mkts | Municipal | Multi-State |
| 1 | 2 | 2 | Money Mkts | Municipal | Single State |
| 2 | 0 | 0 | Muni Bond | | |
| 2 | 1 | 0 | Muni Bohd | Short-Term | |
| 2 | 1 | 1 | Muni Bond | Short-Term | Multi-State |
| 2 | 1 | 2 | Muni Bond | Short-Term | Single State |
| 2 | 2 | 0 | Muni Bond | Int. Term | |
| 2 | 2 | 1 | Muni Bond | Int. Term | Multi-State |
| 2 | 2 | 2 | Muni Bond | Int. Term | Single State |
| 2 | 3 | 0 | Muni Bond | Varied Mat. | |
| 2 | 3 | 1 | Muni Bond | Varied Mat. | Multi-State |
| 2 | 3 | 2 | Muni Bond | Varied Mat. | Single State |
| 2 | 3 | 3 | Muni Bond | Varied Mat. | High Yield |

TABLE 3-continued

Fund Codes

Bucket Codes

| Fund 1 | Fund 2 | Fund 3 | FundName 1 | FundName 2 | FundName 3 |
|---|---|---|---|---|---|
| 2 | 4 | 0 | Muni Bond | Insured | |
| 2 | 4 | 1 | Muni Bond | Insured | Multi-State |
| 2 | 4 | 2 | Muni Bond | Insured | Single State |
| 3 | 0 | 0 | Dom. Taxable Bond | | |
| 3 | 1 | 0 | Dom. Taxable Bond | Short-Term | |
| 3 | 1 | 1 | Dom. Taxable Bond | Short-Term | Ultra-Short Oblig. |
| 3 | 1 | 2 | Dom. Taxable Bond | Short-Term | US Treasury |
| 3 | 1 | 3 | Dom. Taxable Bond | Short-Term | US Gov't |
| 3 | 1 | 4 | Dom. Taxable Bond | Short-Term | Inv. Grade |
| 3 | 2 | 0 | Dom. Taxable Bond | Int. Term | |
| 3 | 2 | 1 | Dom. Taxable Bond | Int. Term | US Treasury |
| 3 | 2 | 2 | Dom. Taxable Bond | Int. Term | US Gov't |
| 3 | 2 | 3 | Dom. Taxable Bond | Int. Term | Inv. Grade |
| 3 | 3 | 0 | Dom. Taxable Bond | Varied Mat. | |
| 3 | 3 | 1 | Dom. Taxable Bond | Varied Mat. | US Treasury |
| 3 | 3 | 2 | Dom. Taxable Bond | Varied Mat. | US Gov't |
| 3 | 3 | 3 | Dom. Taxable Bond | Varied Mat. | Target Mat. |
| 3 | 3 | 4 | Dom. Taxable Bond | Varied Mat. | General Bond |
| 3 | 3 | 5 | Dom. Taxable Bond | Varied Mat. | Flex. Inc. |
| 3 | 3 | 6 | Dom. Taxable Bond | Varied Mat. | Misc. Funds |
| 3 | 4 | 0 | Dom. Taxable Bond | Mtg-Backed | |
| 3 | 4 | 1 | Dom. Taxable Bond | Mtg-Backed | GNMA |
| 3 | 4 | 2 | Dom. Taxable Bond | Mtg-Backed | Adj-Rate Mtg |
| 3 | 4 | 3 | Dom. Taxable Bond | Mtg-Backed | US Mtg |
| 3 | 5 | 0 | Dom. Taxable Bond | Corp. Debt | |
| 3 | 5 | 1 | Dom. Taxable Bond | Corp. Debt | Corp A-Rated |
| 3 | 5 | 2 | Dom. Taxable Bond | Corp. Debt | Corp BBB-Rated |
| 3 | 5 | 3 | Dom. Taxable Bond | Corp. Debt | Loan Part. |
| 3 | 5 | 4 | Dom. Taxable Bond | Corp. Debt | High Current Yield |
| 4 | 0 | 0 | Blended Debt/Equity | | |
| 4 | 1 | 0 | Blended Debt/Equity | Adj. Mix | |
| 4 | 1 | 1 | Blended Debt/Equity | Adj. Mix | Convertible Sec. |
| 4 | 1 | 2 | Blended Debt/Equity | Adj. Mix | Income |
| 4 | 1 | 3 | Blended Debt/Equity | Adj. Mix | Flex. Profolio |
| 4 | 1 | 4 | Blended Debt/Equity | Adj. Mix | Multi-Sector Income |
| 4 | 2 | 0 | Blended Debt/Equity | Balanced | |
| 4 | 2 | 1 | Blended Debt/Equity | Balanced | General |
| 4 | 2 | 2 | Blended Debt/Equity | Balanced | Target Mat. |

TABLE 3-continued

Fund Codes

Bucket Codes

| Fund 1 | Fund 2 | Fund 3 | FundName 1 | FundName 2 | FundName 3 |
|---|---|---|---|---|---|
| 5 | 0 | 0 | Domestic Equity Funds | | |
| 5 | 1 | 0 | Domestic Equity Funds | Income | |
| 5 | 1 | 1 | Domestic Equity Funds | Income | Dual-Purpose/Inc. |
| 5 | 1 | 2 | Domestic Equity Funds | Income | Equity Inc. |
| 5 | 2 | 0 | Domestic Equity Funds | Growth/Inc. | |
| 5 | 2 | 1 | Domestic Equity Funds | Growth/Inc. | Growth & Inc. |
| 5 | 2 | 2 | Domestic Equity Funds | Growth/Inc. | S & P 500 Index |
| 5 | 3 | 0 | Domestic Equity Funds | Capital Growth | |
| 5 | 3 | 1 | Domestic Equity Funds | Capital Growth | Growth |
| 5 | 3 | 2 | Domestic Equity Funds | Capital Growth | Dual-Purpose Cap. |
| 5 | 3 | 3 | Domestic Equity Funds | Capital Growth | Mid-Cap |
| 5 | 3 | 4 | Domestic Equity Funds | Capital Growth | Small Co. Growth |
| 5 | 3 | 5 | Domestic Equity Funds | Capital Growth | Capital Appr. |
| 5 | 4 | 0 | Domestic Equity Funds | Ind. Sector | |
| 5 | 4 | 1 | Domestic Equity Funds | Ind. Sector | Environmental |
| 5 | 4 | 2 | Domestic Equity Funds | Ind. Sector | Financial Services |
| 5 | 4 | 3 | Domestic Equity Funds | Ind. Sector | Health/Biotech |
| 5 | 4 | 4 | Domestic Equity Funds | Ind. Sector | Nat'l Resources |
| 5 | 4 | 5 | Domestic Equity Funds | Ind. Sector | Real Estate |
| 5 | 4 | 6 | Domestic Equity Funds | Ind. Sector | Science & Tech. |
| 5 | 4 | 7 | Domestic Equity Funds | Ind. Sector | Utility |
| 5 | 4 | 8 | Domestic Equity Funds | Ind. Sector | Specialty & Misc. |
| 6 | 0 | 0 | International | | |
| 6 | 1 | 0 | International | Inc. Oriented | |
| 6 | 1 | 1 | International | Inc. Oriented | Short Multi-Mkt (World) |
| 6 | 1 | 2 | International | Inc. Oriented | Short Single-Mkt (Non-U.S.) |
| 6 | 1 | 3 | International | Inc. Oriented | General World Inc. |
| 6 | 1 | 4 | International | Inc. Oriented | Emerging Markets Debt |
| 6 | 2 | 0 | International | Equ-Oriented Multi-Nat'l | |
| 6 | 2 | 1 | International | Equ-Oriented Multi-Nat'l | Flex. Portfolio |
| 6 | 2 | 2 | International | Equ-Oriented Multi-Nat'l | Global Equ. (Incl. US) |
| 6 | 2 | 3 | International | Equ-Oriented Multi-Nat'l | International (Non-US) |
| 6 | 2 | 4 | International | Equ-Oriented Multi-Nat'l | Gold-Oriented |
| 6 | 3 | 0 | International | Small Co. Multi-Nat'l | |
| 6 | 3 | 1 | International | Small Co. Multi-Nat'l | Global (Incl. US) |
| 6 | 3 | 2 | International | Small Co.X Multi-Nat'l | International (Non-US) |
| 6 | 4 | 0 | International | Regional | |
| 6 | 4 | 1 | International | Regional | European |
| 6 | 4 | 2 | International | Regional | Pacific |
| 6 | 4 | 3 | International | Regional | Emerging Mkts |

TABLE 3-continued

Fund Codes

Bucket Codes

| Fund 1 | Fund 2 | Fund 3 | FundName 1 | FundName 2 | FundName 3 |
|---|---|---|---|---|---|
| 6 | 4 | 4 | International | Regional | Japanese |
| 6 | 4 | 5 | International | Regional | Latin America |
| 6 | 4 | 6 | International | Regional | Canadian |
| 7 | 0 | 0 | Unclassified Funds | | |
| X | X | X | Unclassified Funds | | |

3. Description of the System Implementation

Figure 5:
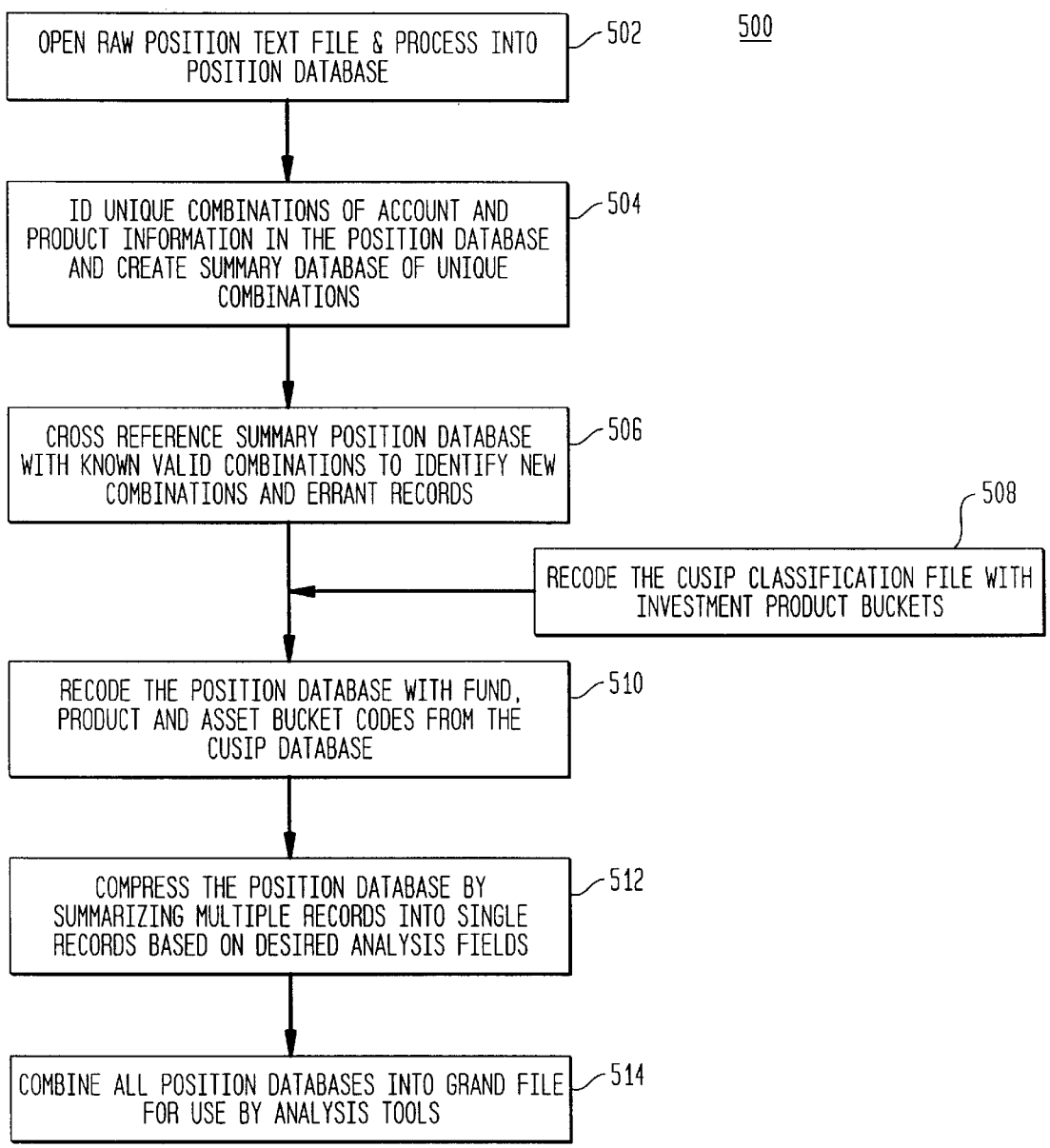
FIG. 5 is a control flow diagram representing an overview of the operation of the investment product reclassification and aggregation process.

FIG. 5 illustrates the main procedure 500 for classifying investment products. The system is preferably implemented on a computer system as a series of process steps.

After the raw position text file from a financial institution has been processed into position database 302 in step 502, position database 302 is summarized in step 504. The summarization process comprises the steps of identifying unique combinations of ZIP code, account, CUSIP number information in the position database 302 from the internal codes provided by the financial institutions. As would be recognized by one of skill in the relevant art, the provider and nature of the data processed by the present invention is implementation and application specific. The present invention is equally applicable to position data from other sources as well as to other types of financial data.

After the unique combinations of information in position database 302 are identified, new summary position databases 308, 310 are created that include a record for each unique combination of information stored in position database 302. Position database 302 can be summarized on multiple combinations of fields resulting in multiple summary position databases 308, 310. By creating a summary database, the information in position database 302 can be verified against known valid combinations of fund, account, product and asset codes. As described above, the summarization step facilitates cross-referencing and ensures that information in position database 302 is valid. The summarization process could also be applied to record-level files containing elements such as the number of accounts, transactions, trades, revenue credits or any other financial data which can be associated with a specific CUSIP number.

The main procedure 500 includes seven high level steps that process the financial institution's data into a final form for analysis. Step 502 opens the raw position text file and processes it into position database 302. The raw position text file is provided by a financial institution and contains investment position information. A position corresponds to an individual holding of a single investment product. For example, an individual holding 50 shares of a particular issue of stock would constitute a position. Position information could include for example; ZIP code, customer type (e.g., individuals, trustees, etc.), customer gender, customer age, account type (regular taxable, IRA, etc.), account date, shares owned, asset value, and other position related information. The raw position text file is processed into a position database with each record corresponding to an individual position at step 502.

After position database 302 has been summarized in step 504, the information in position database 302 is verified at step 506. The verification step 506 is performed to test the validity of the position data and to identify new field combinations in position database 302. By cross-referencing summary position database(s) 304, 306 with known valid combinations of fund, account, product and asset information, errant data and new combinations can be identified. Cross reference step 506 ensures the integrity of the data in the position database 302. Errant records (containing erroneous information) are removed and records containing new unique combinations of information are identified and added to the cross-reference database at step 506.

Step 508 of main procedure 500 recodes CUSIP classification file 104 with standard fund, product and asset bucket codes. As noted above, S&P assigns a unique CUSIP number for every issue. IDC compiles a database of all valid CUSIP numbers and prospectus information associated with each security. CUSIP classification file 104 is recoded with standard fund, product and asset bucket codes at step 508. Prior to the recoding of CUSIP classification file 104, the prospectus information is contained in many different fields, each of which may contain numerous different values. The many permutations of the prospectus information fields makes analysis of the prospectus information difficult. The recoding, therefore, is used to identify a manageable number of product, asset and fund types for analysis. After recoding step 508, CUSIP classification file 104 contains a fixed number of known standard bucket codes.

After the information in position database 302 has been verified in step 506, step 510 recodes position database 302 with standard product, fund and asset bucket codes from the recoded CUSIP classification file 104 from step 508. Step 510 maps the recoded CUSIP classification file 104 to position database 302, keyed on CUSIP number. The product, fund and asset bucket codes in the CUSIP classification file 104 are then copied into position database 302 for corresponding CUSIP numbers. After position database 302 has been recoded with the bucket codes, it is possible to analyze position database 302 based on the bucket codes.

After position database 302 has been recoded with the buckets in step 510, position database 302 is compressed in step 512. The compression process summarizes multiple records in position database 302 into single records based on desired analysis fields. The summarization process results in a summary position database 406 with each record containing a unique combination of the fields specified for analysis purposes. The preferred embodiment employs summarization on the product, fund and asset buckets combined with ZIP code. The summary position database 406 is usually smaller than position database 302.

After position database 302 has been compressed in step 512, step 514 creates a aggregate position database. Steps 502–512 have generated a summary position database 406 for an individual financial institution. Position database 302 for that financial institution has been processed in a standardized form. The standardized form allows the summary position database 406 to be combined with summary position databases from other financial institutions. This enables analysis of multiple financial institutions' position information at the same time. By combining the standardized and recoded position databases from a plurality of financial institutions, an aggregate position database file is created at step 514. The aggregate position database represents the records of a plurality of financial institutions whose position text files have been processed in steps 502–512. The aggregate file created in step 514 can represent the entire financial product marketplace, allowing analysis of market-wide financial information. In an alternative embodiment, a particular subset of the market can be represented by aggregating a subset of the position databases into aggregate position database.

Figure 6:
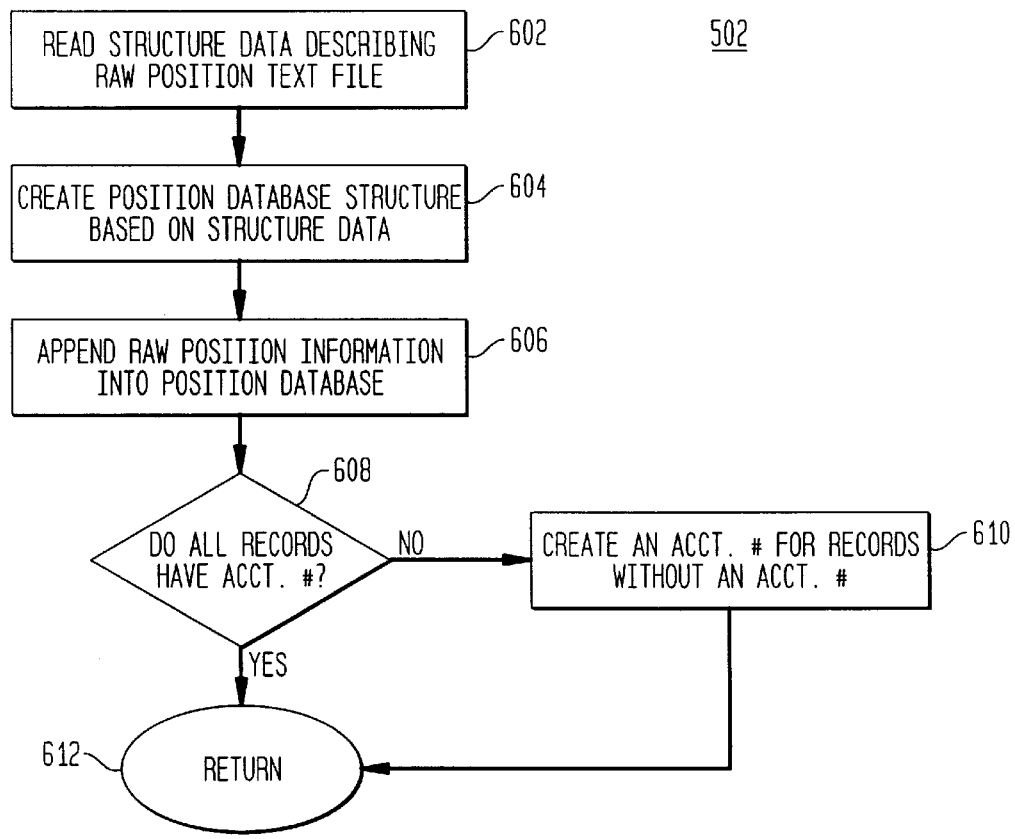
FIG. 6 is a control flow diagram representing the creation of a position database from a raw position text file.

FIG. 6 further illustrates the process of converting the raw position text file into position database 302 of step 502. Data describing the structure of the raw position text file is read from a lookup file in step 602. The data read in step 602 contains, for example, how the raw position text file is delimited, how many fields are contained in the raw position text file, the nature of the data contained in the raw position text file (i.e., character or numeric), the length of the information contained in the raw position text file, etc. This step ensures correct alignment of the information from the raw position text file with the fields of position database 302 that is to be created. Next, a position database structure is created in step 604 based on the data read in step 602. The raw position information is then appended from the raw position text file into position database 302 in step 606. Position database 302 created in step 606 is then checked for valid account numbers at step 608. If it is determined at step 608 that not all records in position database 302 contain account numbers, an account number for each record lacking one is created in step 610. If all the records in position database 302 have account numbers (or have new account numbers from step 610), then the process returns to the main procedure 500 at step 612.

Figure 7:
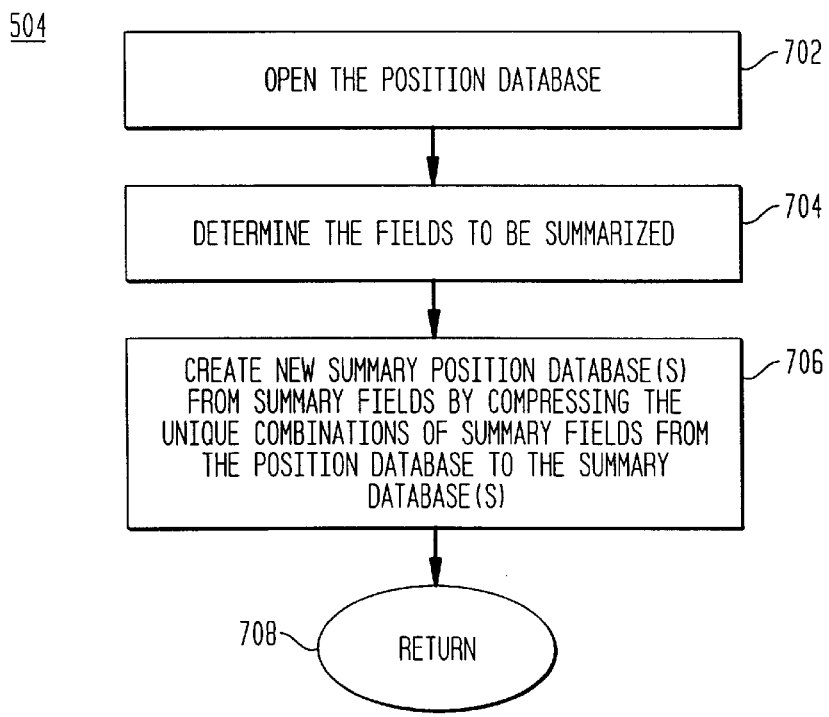
FIG. 7 is a control flow diagram representing the process of summarizing the position database.

FIG. 7 further illustrates summarizing position database 302, step 504. After position database 302 has been created in step 502, position database 302 is summarized at step 504. The summarization process has been described in more detail in conjunction with FIG. 3, above. First, position database 302 is opened at step 702. The process then determines the fields to be summarized at step 704. The summary fields could include any information which lends itself to verification such as account type, product type, ZIP code, etc. Based on the fields determined in step 704, new summary position databases 304, 306 are created in step 706. Unique combinations of the fields determined in step 704 are copied into new summary position databases 304, 306 at step 706. After the summary position databases 304, 306 have been created at step 706, the process returns to main procedure 500 at step 708.

If multiple fields or field combinations are to be verified, position database 302 can be summarized on different fields and field combinations, resulting in multiple summary position databases 304, 306 at step 504. These multiple summary position databases 304, 306 would then be verified against multiple cross-reference databases 308, 310 for verification. For example, position database 302 could be summarized on ZIP code, to ensure no invalid ZIP codes are contained in position database 302 that would cause analysis errors later. Likewise, the product and other codes can be verified independently using multiple summary and cross-reference files. For the purposes of explanation, however, the number and combination of the fields that are verified have been limited.

Figure 8:
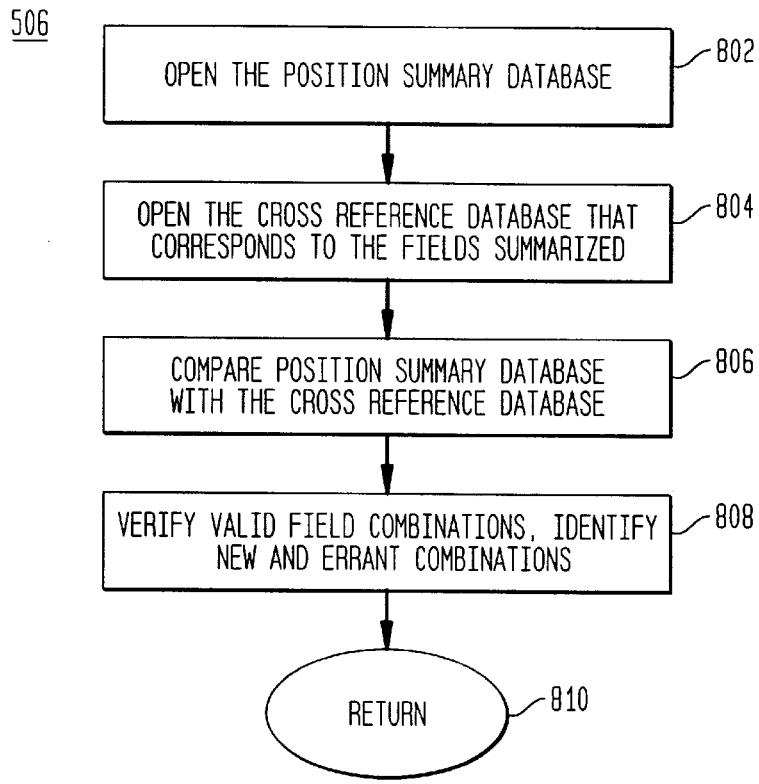
FIG. 8 is a control flow diagram representing the process of verifying the position database information.

FIG. 8 is a more detailed illustration of the data verification process, step 506. First, both the summary position and cross-reference databases 308, 310 are opened at step 802 and 804. Cross reference databases 308, 310 contain known valid combinations of fields to be compared with the field combinations in summary position database 304, 306. The two databases are compared at step 806. The comparison is then used to identify valid, new, and errant field combinations at step 808. The process returns to the main procedure 500 flow at step 810.

Figure 9:
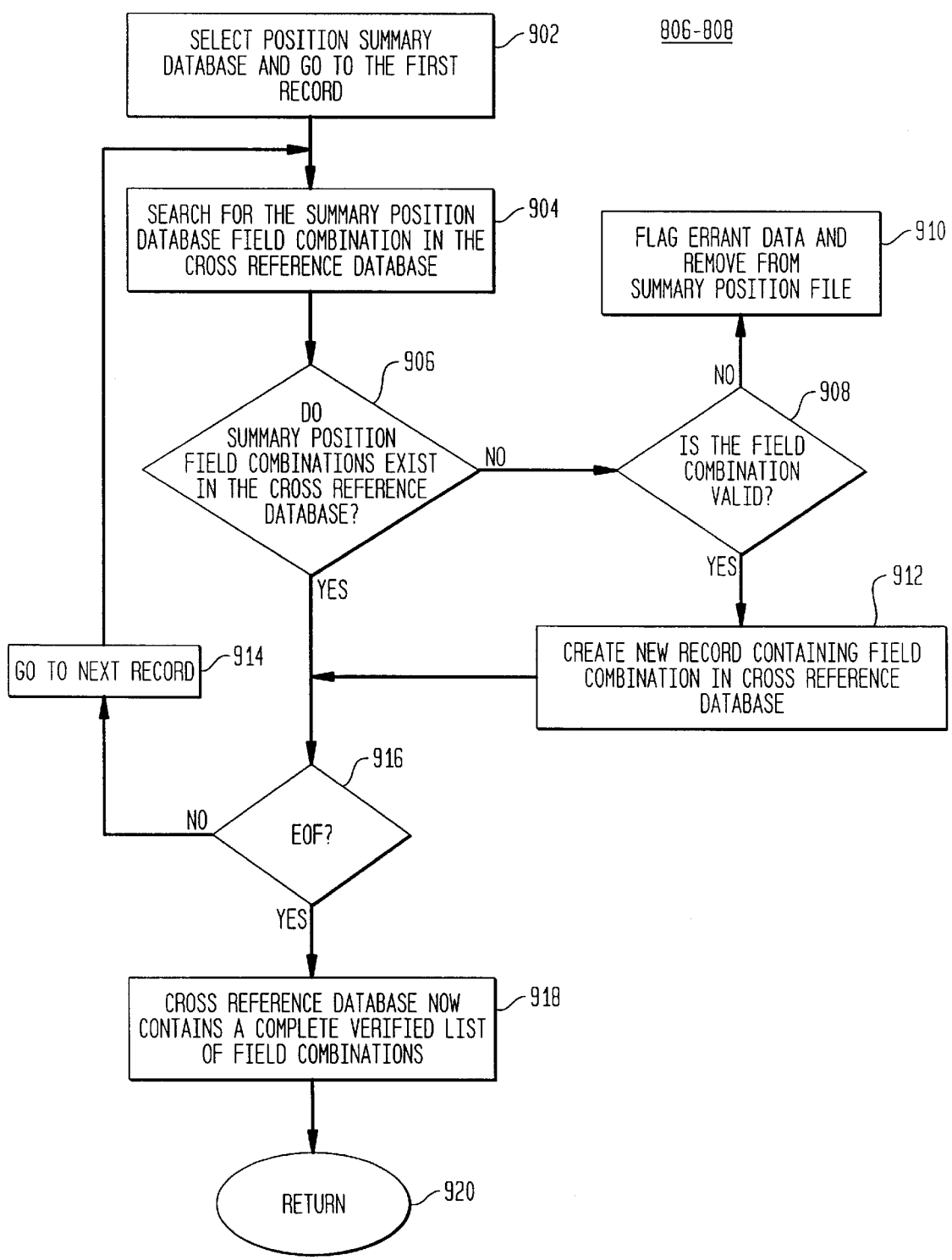
FIG. 9 is a control flow diagram further illustrating the process of verifying the position database information.

FIG. 9 illustrates a more detailed view of verifying the field combinations in summary position database 304, 306, steps 806 and 808. Summary position database 304, 306 is selected in step 902. Cross-reference database 308, 310 is then searched for the combination of fields contained at the first record in Summary position database 304, 306 at step 904. If the field combination from the summary position database 304, 306 exists in the cross-reference database, then the field combination is determined to be a known valid combination at step 906. The process then continues to step 916 to determine whether the end of the summary position database 304, 306 has been reached. If the process has reached the end of summary position database 304, 306, then it is known that the cross-reference database now contains a complete, verified list of field combinations at step 918.

If, on the other hand, it is determined that the end of summary position database 304, 306 has not been reached at step 916, then the next record in summary position database 304, 306 is selected at step 914 and the process continues in a loop to step 904. At step 906, if the summary position database field combination does not exist in the cross-reference database, then the process determines if the field combination is valid at step 908. If the field combination is not valid, then the errant data in summary position database 304, 306 is flagged and removed from summary position database 304, 306 at step 910. If, on the other hand, the field combination is deemed to be valid at step 908, then a new field combination is created in the cross-reference database at step 912. The process then determines whether the end of file has been reached at step 916. After the end of summary position database 304, 306 has been reached at step 916, the process returns to the main procedure 500 at step 920.

Figure 10:
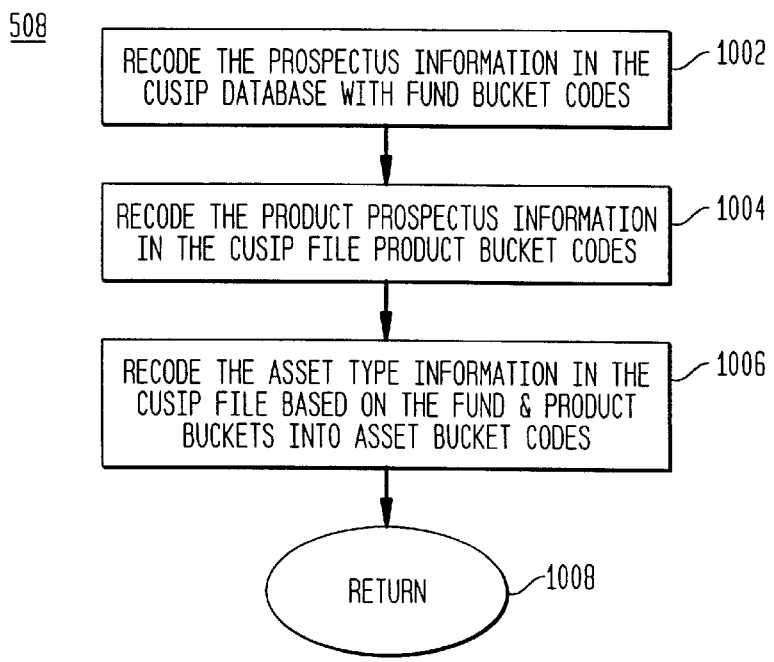
FIG. 10 is a control flow diagram representing the process of recoding the CUSIP classification file with product, asset and fund bucket codes.

FIG. 10 further illustrates the recoding of the CUSIP classification file 104 step 508. The recoding of CUSIP classification file 104 can be completed anytime in the process before position database 302 is recoded at step 510. The recoding of CUSIP classification file 104 begins at step 1002, where the fund bucket codes are copied into the CUSIP classification file 104. After CUSIP classification file 104 has been recoded with fund bucket codes, CUSIP classification file 104 is recoded with the product bucket codes in step 1004. After CUSIP classification file 104 has been recoded with both the fund bucket codes at step 1002 and the product bucket codes at step 1004, CUSIP classification file 104 is recoded with the asset bucket codes at step 406. The asset bucket codes are determined based on the combination of fund and product bucket codes in each record of CUSIP classification file 104. It is necessary, therefore, that the asset bucket codes be determined at step 406 after steps 402 and 404. After the completion of step 406, the process returns to the main procedure 500 at step 408.

Figure 11:
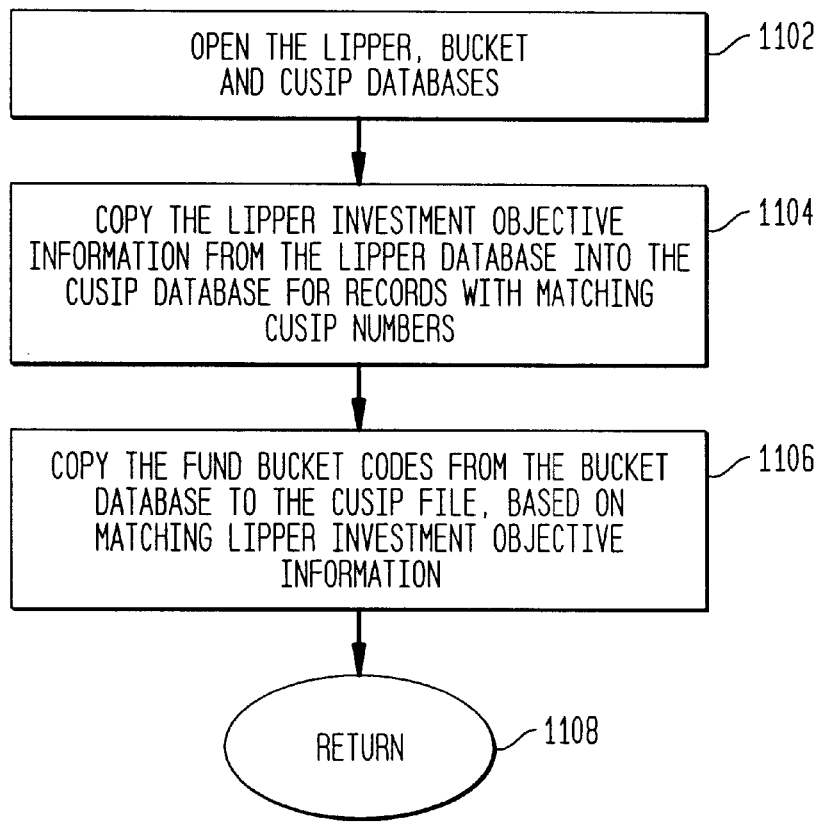
FIG. 11 is a control flow diagram representing the operation of recoding the CUSIP classification file with fund bucket codes.

FIG. 11 further illustrates how CUSIP classification file 104 is recoded with the Lipper Analytical Services' information at step 402. The CUSIP and Lipper database files are opened at step 1102. After the CUSIP and Lipper files have been opened, the Lipper database is related (mapped) into CUSIP classification file 104 based on CUSIP number, and the Lipper Investment Objectives from the Lipper database 102 are copied into CUSIP classification file 104 at step 1104. CUSIP classification file 104 is then mapped to bucket database 202 keyed on Lipper Investment Objectives. Bucket database 202 contains bucket codes defining fund, product and asset buckets, and the Lipper Investment Objectives to which they correspond. The fund bucket codes are then copied from bucket database 202 into CUSIP classification file 104 at step 1106, matching on Lipper Investment Objectives. The process returns to process 506 at step 1108.

Figure 12:
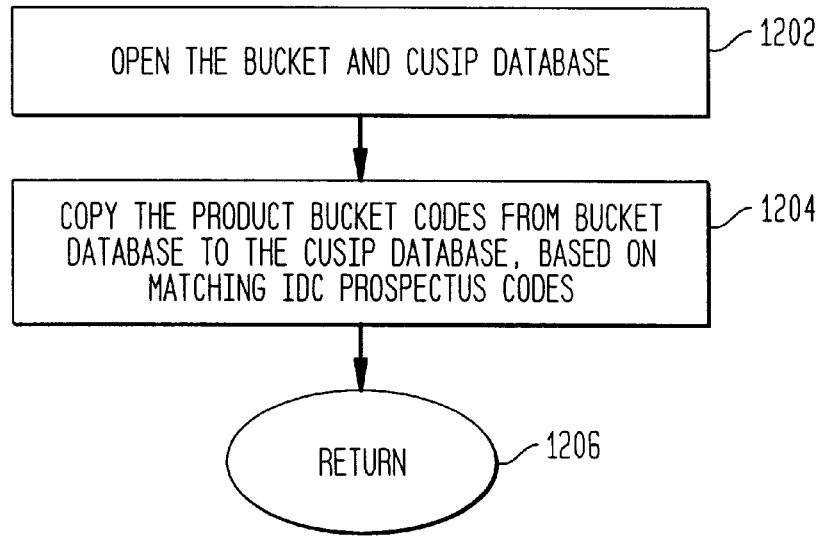
FIG. 12 is a control flow diagram representing the operation of recoding the CUSIP classification file with product bucket codes.

FIG. 12 illustrates recoding of product type information in CUSIP classification file 104 at step 1004 in more detail. Bucket database 202 and CUSIP classification file 104 are opened at step 1202. Bucket database 202 contains bucket codes defining fund, product and asset buckets, and the IDC prospectus codes to which they correspond. Bucket database 202 is mapped into CUSIP classification file 104 based on IDC prospectus codes. The product bucket codes from the bucket database 202 are then copied into CUSIP classification file 104, record by record, for matching combinations of IDC prospectus codes at step 1204.

Figure 13:
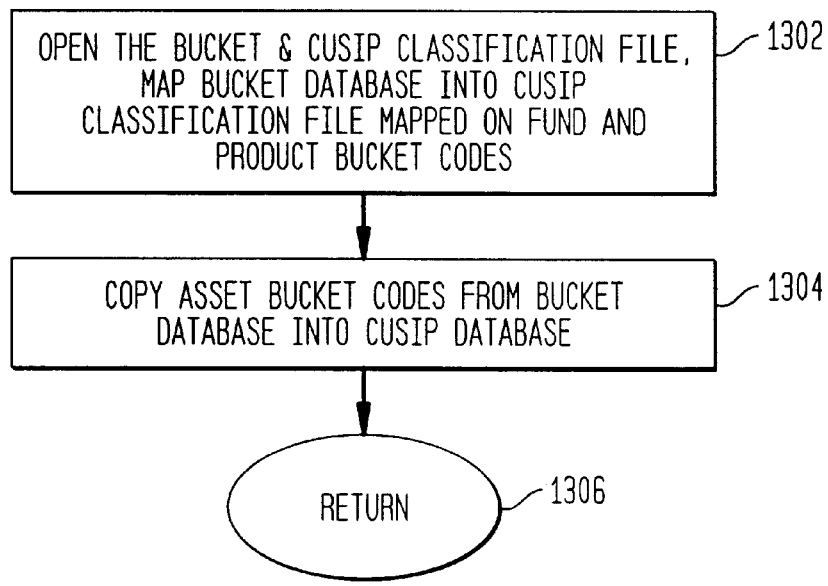
FIG. 13 is a control flow diagram representing the operation of recoding the CUSIP classification file with asset bucket codes.

FIG. 13 is a more detailed illustration of recoding CUSIP classification file 104 with asset bucket codes of step 1008. Bucket database 202 is opened and mapped into CUSIP classification file 104 based on matching combinations of fund and product bucket codes at step 1302. The asset bucket codes are then copied from bucket database 202 into CUSIP classification file 104 for matching combinations of fund and product buckets at step 1304. After the asset bucket codes of CUSIP database 202 have been recoded, the process returns to the main procedure 500 at step 510.

Figure 14:
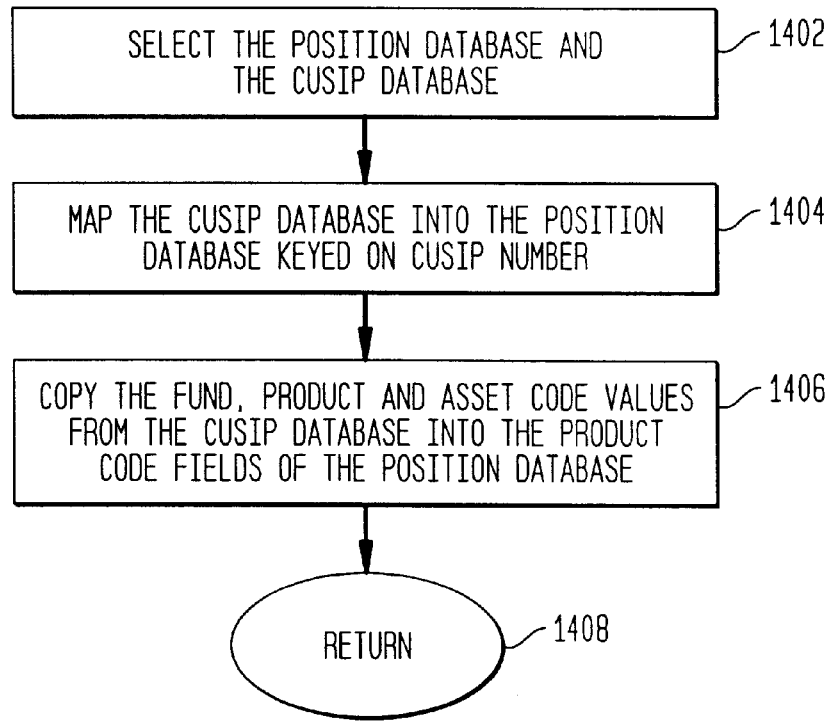
FIG. 14 is a control flow diagram representing the operation of recoding the position database with fund, product and asset bucket codes from the CUSIP classification file.

FIG. 14 is a more detailed illustration of recoding the position database 302, step 510. First position database 302 and CUSIP classification file 104 are selected. CUSIP classification file 104 and position database 302 are mapped based on CUSIP number at step 1404. Next, the fund, product and asset bucket codes are copied from CUSIP classification file 104 into position database 302. After the fund, product and asset buckets have been assigned to each investment product of position database 302, the process returns to the main procedure 500 at step 512.

Figure 15:
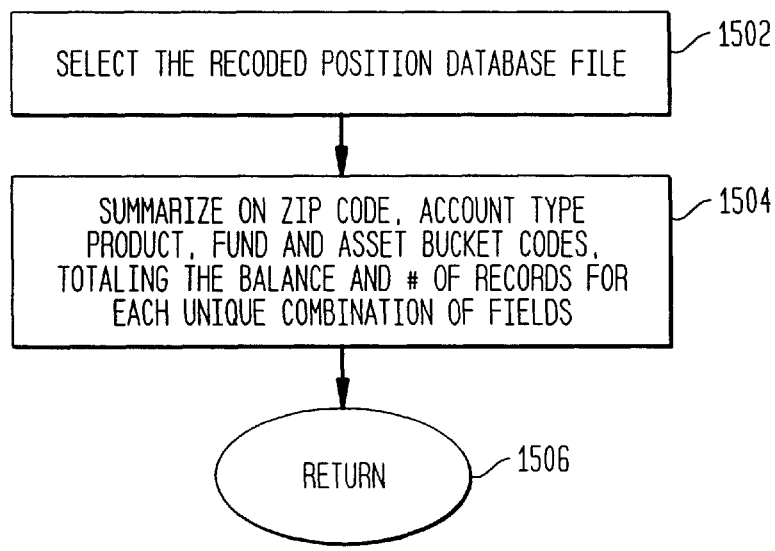
FIG. 15 is a control flow diagram representing the process of summarizing the recoded position database.

FIG. 15 further illustrates the compression of position database 302 at step 512. Recoded position database 302 is selected at step 1502. The process of step 512 is very similar to the process of step 504, where the summary position database 304, 306 is created. The process then summarizes recoded position database 302 on the fund, product, and asset buckets combined with ZIP code and totaling the number of records and investment amounts for each unique combination. As stated above, the summarization process results in a summary database that contains all of the unique combinations of the fields specified for the summarization process. The summary will allow analysis based on the summary fields. It should be recognized, however, that since the summary fields are determined by the analysis procedure, the selection of more, fewer or different fields to summarize is encompassed by this invention. After the summarization process, step 512, position database 406 has been put in standardized form. The standardized summary position database 406 will then be combined with standardized position databases from other financial institutions to produce a aggregate file that provides a more complete view of the financial position marketplace. After the summarization process at step 1504, the process then returns to main procedure 500 at step 1506.

Figure 16:
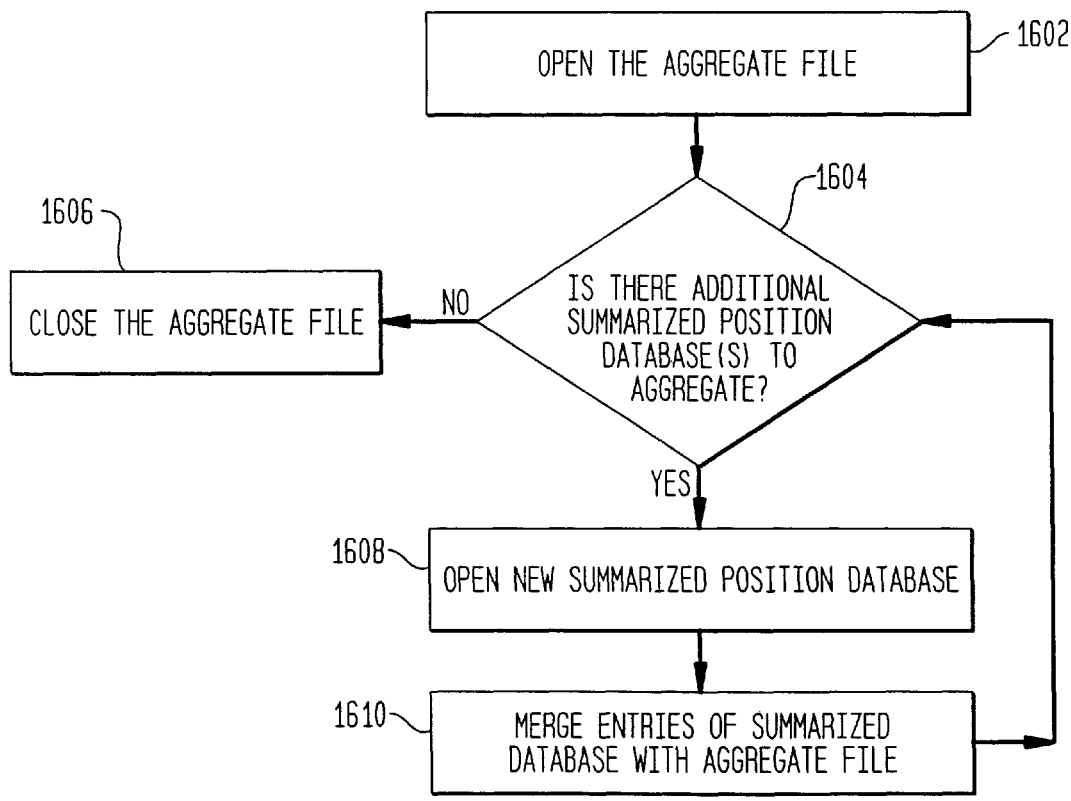
FIG. 16 is a control flow diagram representing the process of aggregating the recoded position databases into an aggregate file.

FIG. 16 is a more detailed illustration of creating the aggregate file at step 514. The aggregate file is a compilation file of a plurality of summarized position databases 406 that have been processed. For example, multiple financial institutions produce multiple raw position text files. These position databases are processed by steps 502–512 and then combined into a aggregate file. The procedure to create the aggregate file begins with opening the aggregate file at step 1602. After step 1602, it is determined whether there are new, final summarized position databases 406 to be added to the aggregate file at step 1604. If there are no additional summarized position databases 406 to be added, the aggregate file is closed at step 1606. If, on the other hand, there are additional summarized position databases 406 to be added to the aggregate file, the new summarized position file 406 is opened at step 1608. The records of the new summarized position file 406 are then merged with the aggregate file at step 1610. Merging the newly created summarized position file 406 with the aggregate file is accomplished by appending the records of the summarized position file 406 to the aggregate file, so that the aggregate file contains all of the different financial institutions' position information. The process then continues to step 1604, where it is determined whether additional summarized position files exist to be added to the aggregate file. This process continues until there are no additional summarized position files to be added to the aggregate file, in which case the aggregate file is complete.

4. System Configuration

Figure 17:
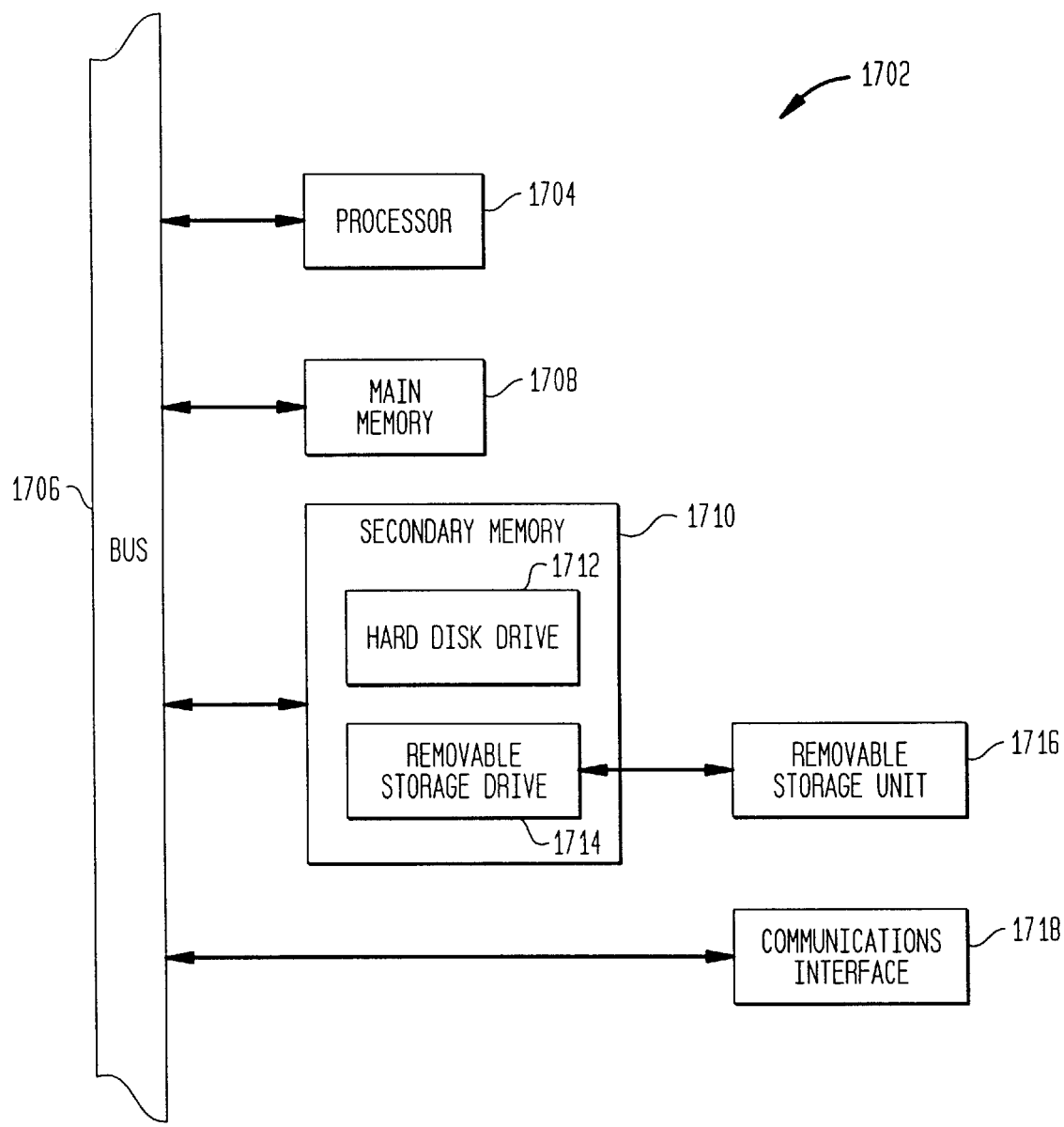
FIG. 17 is a block diagram illustrating an exemplary computer system used for implementing the present invention.

The chosen embodiment of the present invention is computer software executing within a computer system. FIG. 17 shows an exemplary computer system. The computer system 1702 includes one or more processors, such as a processor 1704. The processor 1704 is connected to a communication bus 1706.

The computer system 1702 also includes a main memory 1708, preferably random access memory (RAM), and a secondary memory 1710. The secondary memory 1710 includes, for example, a hard disk drive 1712 and/or a removable storage drive 1714, representing a floppy disk drive, a magnetic tape drive, a compact disk drive, a program cartridge and cartridge interface (such as that found in video game devices), a removable memory chip (such as EPROM, or PROM), etc. which is read and written to by a removable storage unit 1716. Removable storage unit 1716, also called a program storage device or a computer program product, represents a floppy disk, magnetic tape, compact disk, etc. As will be appreciated, the removable storage unit 1716 includes a computer usable storage medium having stored therein computer software and/or data. The removable storage drive 1714 reads from and/or writes to a removable storage unit 1716 in a well-known manner.

The computer system 1702 may also include other similar means for allowing computer programs or other instructions to be loaded. Such means can include, for example, a communications interface 1718. Communications interface 1718 allows software and data to be transferred between computer system 1702 and external devices. Examples of communications interface 1718 can include a modem, a network interface (such as an Ethernet card), a communications port, etc. Software and data transferred via communications interface 1718 are in the form of signals which can be electronic, electromagnetic, optical or other signals capable of being received by communications interface 1718.

In this document, the term "computer program product" is used to generally refer to removable storage unit 1716, a hard disk installed in hard disk drive 1712, and signals transferred via communications interface 1718. These computer program products are means for providing software to a computer system 1702.

In an embodiment where the invention is implemented using software, the software may be stored in main memory 1708, or in a computer program product and loaded into computer system 1702 using removable storage drive 1714, hard disk drive 1712, or communications interface 1718. The software, when executed by the processor 1704, causes the processor 1704 to perform the functions of the invention as described herein.

In another embodiment, the invention is implemented primarily in hardware using, for example, a hardware state machine. Implementation of the hardware state machine so as to perform the functions described herein will be apparent to persons skilled in the relevant arts.

The best mode of the present invention is directed to a computer system 1702 comprising a personal computer. More specifically, the personal computer includes, in the preferred embodiment, a Pentium processor with 66 or 90 MHZ, executing Windows NT, or a Gateway 2000 Pentium processor with 133 MHZ, executing Windows 95. Furthermore, the preferred embodiment includes a personal computer having 4 gigabytes (GB) of memory with 32 megabytes (MB) of RAM. It should be understood, however, that the invention is not limited to this embodiment. Instead, the invention is described with reference to these computer systems for convenience purpose only. Other computer systems could alternatively be used.

Additionally, the preferred embodiment is directed to the present invention being implemented in software. Preferably, Microsoft Visual FoxPro, version 3.0, and Delphi execute on the chosen computer system. It should be understood that the invention is described with reference to Visual FoxPro and Delphi for convenience purpose only. Other software packages could alternatively be used.

5. Analysis of Resultant Data

After the position databases have been recoded, summarized and collected into the aggregate file, the aggregate file can be analyzed. The product, asset and fund bucket codes in conjunction with ZIP code, and other position information can be analyzed by any of a number of data analysis tools currently available. In the preferred embodiment, GeoFrame is a software package designed specifically to exploit the data that is produced in the recoding process. GeoFrame was developed in the Delphi programming language with a Borland Database search engine. One of skill in the relevant art, however, will recognize that there are many database and geographic analysis tools available to analyze and manipulate the product of the present invention.

Figure 18:
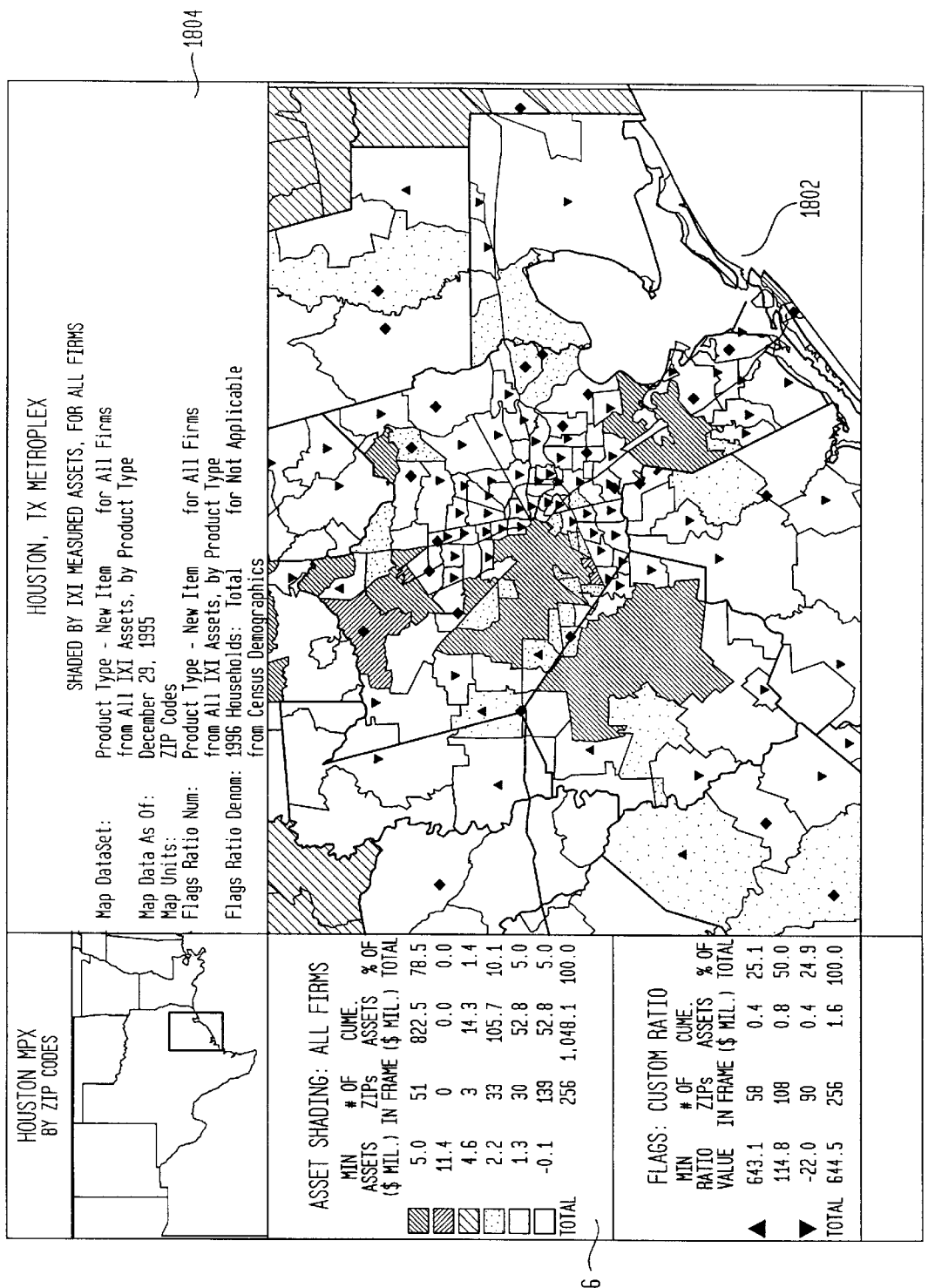
FIG. 18 illustrates how the present invention can be used for geographical analysis of the product of the present invention.

FIG. 18 is an example of geographic analysis and display of the position information.

There are two primary interfaces in the analysis and graphical display tool of the preferred embodiment. The first interface is the geographical area selection interface. The user may select a specific geographical area for data analysis. This geographical area can include groups of individual ZIP codes, counties, states, metroplexes, Metropolitan Statistical Areas (MSAs) and Designated Market Areas (DMAs). MSAs and DMAs are market areas provided by the U.S. Census Bureau and A. C. Nielsen & Company, respectively. Metroplexes are collections of one or more counties that define a greater metropolitan area, or market. The selection of geographic region and the geographic selection interface selects the subset of position data in the aggregate file that corresponds to the geographic area selected. The second interface allows analysis of the data that has been selected in the geographic selection interface. Through the second interface, the user can specify the investment product buckets and types of analysis to be performed on the information selected in the geographical interface.

FIG. 18 is a graphical representation of how the recoded data in the position database may be analyzed. Map 1802 represents the Houston, Tex. metroplex area by ZIP code. A metroplex is a geographical area comprising one or more counties which, as a set, generally have a minimum population of 100,000 households. The metroplex unit is a construct used to represent greater metropolitan areas for the purposes of investment product data analysis. As can be readily understood, any geographical unit may be used to analyze the investment product position information. Map 1802 is divided into smaller geographic areas which represent individual ZIP codes in the Houston metroplex area. In the metroplex area of Map 1802, the ZIP code areas are given different shadings corresponding to the amount of assets in the metroplex area. Each area is given a darker shading to represent the greater share of the total investment product assets for the metroplex area. A lighter shading indicates that the ZIP code area contains a smaller share of the assets in the metroplex area.

Table 1806 describes the quantitative relationship between the shading in map 1802 and the assets in each of the ZIP codes. For example, unshaded areas to very lightly shaded areas represent minimum assets of 0 to 2.2 million dollars per ZIP code.

Figure 19:
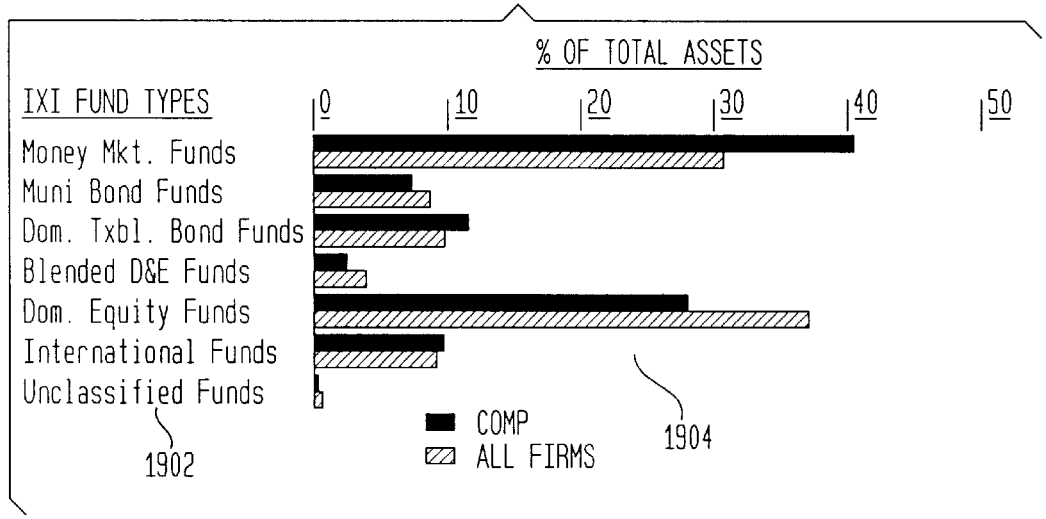
FIG. 19 illustrates how the present invention can be used for bar graph analysis of the product of the present invention.

FIG. 19 illustrates the analysis of a financial institution's relative share of the Houston metroplex open-end mutual fund market by different investment product buckets. The analysis is performed on the investment product buckets at a very high level resulting in only seven different fund types. The different investment product types are embodied by each different fund type illustrated as a fund type list 1902.

For the purposes of the company share report (or relative market share), the percentages of total assets for the particular company with respect to the total investment product market can be compared. The position database is separated into the two primary categories of all firms and the particular financial institution for which the analysis is being performed. The top bar of each pair of bars embodied as element 1904 of FIG. 19 represents the percentage of total assets the clients of a particular financial institution hold in a particular fund type. For example, the clients of the financial institution of FIG. 19 holds approximately 42% of their total assets in Money Market Funds. The lower bar of each set of bars represents the percentage of total assets all firms hold in a particular fund type. For example, the total market of FIG. 19 holds approximately 32% of its total assets in Money Market Funds. Comparison of the two top bars representing the percentage of total assets in Money Market Funds shows that the clients of the particular financial institution in question hold an above average share of Money Market Funds for the particular market.

The company share by fund types report of FIG. 19 identifies which product types are popular in a particular geographic area. By comparing the percent of total asset distribution in the company share report, a financial institution can determine particular investment products which are favored or unfavored in the particular geographical area.

FIGS. 20–24 illustrate a report of all financial position information for the Houston metroplex area. Balances are determined for each individual ZIP code and displayed in decreasing order. The report of FIGS. 20–24 compares the investment products sold by all firms to the investment products sold by the financial institution for whom the report is being run. This enables the financial institution to determine its market share in each individual ZIP code of the Houston metroplex area. For example, the 77024 ZIP code of Houston, Tex. has a total financial position balance of $2.708 billion dollars. The particular financial institution for whom the report is being run, has sold $166.3 million dollars of investment products in the 77024 ZIP code, constituting a 6.14 percent relative market share. The last three columns of data, in FIGS. 20–24, represent the percentages of investment product assets that each ZIP code represents.

Conclusion

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A method of classifying investment related data comprising the steps of:
   generating a CUSIP classification file from a CUSIP data file comprising a plurality of CUSIP numbers, by assigning each of said CUSIP numbers to one of a plurality of security classifications; and
   generating a recoded position database by mapping a position database to said CUSIP classification file, based on CUSIP number, wherein said position database includes a plurality of investment positions, wherein each of said investment positions comprises position information comprising a CUSIP number, information describing the holder of said investment position and investment related data.

2. The method of claim 1, further comprising the step of preprocessing said position database to identify the unique combinations of said position information.

3. The method of claim 1, wherein said CUSIP data file is an external file provided by a third-party vendor.

4. The method of claim 1, further comprising the step of summarizing said recoded position database by identifying non-unique combinations of said position information.

5. The method of claim 1, wherein said recoded position database comprises a plurality of records and further comprising the step of compressing said recoded position database by summarizing said plurality of records within said recoded position database into single records based on unique combinations of position information.

6. The method of claim 1, further comprising the step of aggregating a plurality of said recoded position databases to generate an aggregate position database, wherein said recoded position databases are associated with a plurality of different financial institutions.

7. The method of claim 6, further comprising the step of analyzing each of said recoded position databases with respect to said aggregate position database.

8. A method for analyzing data from a plurality of financial institutions comprising the steps of:
   generating a plurality of recoded position databases, wherein each of said recoded position databases is generated by mapping a position database based on CUSIP number to a CUSIP classification file, wherein said position database includes a plurality of investment positions, wherein each of said of investment positions comprises position information comprising a CUSIP number, information describing the holder of said investment position and investment related data, wherein said recoded position databases are associated with a plurality of financial institutions;
   aggregating said plurality of recoded position databases to generate an aggregate position database; and
   analyzing each of said recoded position databases with respect to said aggregate position database.

9. The method of claim 8, further comprising the step of generating said CUSIP classification file from a CUSIP data file comprising a plurality of CUSIP numbers by assigning each of said CUSIP numbers to one of a plurality of security classifications.

* * * * *

UNITED STATES PATENT AND TRADEMARK OFFICE
CERTIFICATE OF CORRECTION

PATENT NO.    : 6,026,381
DATED         : February 15, 2000
INVENTOR(S)   : Barton, III et al.

Page 1 of 1

It is certified that error appears in the above-identified patent and that said Letters Patent is hereby corrected as shown below:

<u>Title page,</u>
Item [73], replace "ITX" with -- IXI --.

Item [45], replace "Feb. 15, 2000" with -- *Feb. 15, 2000 --.

Between item [73] and item [21], insert:
-- [*] Notice: This patent issued on a continued prosecution application
filed under 37 CFR 1.53(d), and is subject to the twenty
year patent term provisions of 35 U.S.C. 154(a)(2). --

Signed and Sealed this

Fifth Day of February, 2002

*Attest:*

*Attesting Officer*

JAMES E. ROGAN
*Director of the United States Patent and Trademark Office*